United States Patent
Khan

(10) Patent No.: US 10,929,843 B2
(45) Date of Patent: Feb. 23, 2021

(54) STORAGE OF CREDENTIAL SERVICE PROVIDER DATA IN A SECURITY DOMAIN OF A SECURE ELEMENT

(71) Applicant: Apple Inc., Cupertino, CA (US)

(72) Inventor: Ahmer A. Khan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 479 days.

(21) Appl. No.: 14/475,251

(22) Filed: Sep. 2, 2014

(65) Prior Publication Data

US 2015/0324791 A1  Nov. 12, 2015

Related U.S. Application Data

(60) Provisional application No. 61/989,209, filed on May 6, 2014.

(51) Int. Cl.
*G06Q 20/38* (2012.01)
*G06Q 20/36* (2012.01)
(Continued)

(52) U.S. Cl.
CPC ....... *G06Q 20/3821* (2013.01); *G06F 21/335* (2013.01); *G06F 21/42* (2013.01);
(Continued)

(58) Field of Classification Search
None
See application file for complete search history.

(56) References Cited

U.S. PATENT DOCUMENTS 6,005,942 A * 12/1999 Chan ................. G06F 21/51
235/379
9,047,601 B2 * 6/2015 Xie ................. G06Q 30/04
(Continued)

FOREIGN PATENT DOCUMENTS

CN  101729493 A  6/2010
CN  103208065 A  7/2013
(Continued)

OTHER PUBLICATIONS

No stated author; Security of Proximity Mobile Payments (SMA); 2009; Retrieved from the Internet <URL: https://www.securetechalliance.org/resources/pdf/Security_of_Proximity_Mobile_Payments.pdf>; pp. 1-39 as printed.*
(Continued)

*Primary Examiner* — Saleh Najjar
*Assistant Examiner* — Michael W Chao
(74) *Attorney, Agent, or Firm* — Morgan, Lewis & Bockius LLP

(57) ABSTRACT

Systems, methods, and computer-readable media for efficiently storing credential service provider data in a security domain of a secure element of an electronic device are provided. In one example embodiment, an electronic device may include a secure element that, inter alia, receives credential service provider data from a secure element vendor subsystem, and that encrypts a key of the secure element with the received credential service provider data. The electronic device may also include a communications component that transmits the encrypted key to a credential service provider. Additional embodiments are also provided.

38 Claims, 7 Drawing Sheets

(51) Int. Cl.
*H04W 8/20* (2009.01)
*H04W 12/04* (2021.01)
*G06Q 20/32* (2012.01)
*G06Q 20/20* (2012.01)
*G06F 21/33* (2013.01)
*G06F 21/42* (2013.01)
*H04W 12/06* (2021.01)
*H04W 12/08* (2021.01)
*H04L 9/08* (2006.01)
*H04W 4/80* (2018.01)
*G06Q 20/34* (2012.01)
*H04L 29/06* (2006.01)

(52) U.S. Cl.
CPC ......... *G06Q 20/20* (2013.01); *G06Q 20/3278* (2013.01); *G06Q 20/36* (2013.01); *G06Q 20/3829* (2013.01); *H04L 9/0897* (2013.01); *H04W 8/20* (2013.01); *H04W 12/04* (2013.01); *H04W 12/0608* (2019.01); *H04W 12/0806* (2019.01); *G06F 2221/2107* (2013.01); *G06F 2221/2153* (2013.01); *G06Q 20/3552* (2013.01); *H04L 63/062* (2013.01); *H04W 4/80* (2018.02)

(56) References Cited

U.S. PATENT DOCUMENTS

| | | | |
|---|---|---|---|
| 9,159,063 B1* | 10/2015 | McDonald | G06Q 20/3829 |
| 9,240,009 B2* | 1/2016 | Koh | G06Q 20/352 |
| 9,384,485 B1* | 7/2016 | McDonald | G06Q 20/3829 |
| 9,762,572 B2* | 9/2017 | Lord | H04L 63/0853 |
| 9,775,024 B2* | 9/2017 | Park | H04W 8/183 |
| 9,794,368 B2* | 10/2017 | Kweon | H04L 67/306 |
| 9,967,247 B2* | 5/2018 | Chastain | H04W 12/0023 |
| 10,210,516 B2* | 2/2019 | Koh | G06Q 20/401 |
| 10,600,046 B2* | 3/2020 | Xie | G06Q 30/04 |
| 10,699,267 B2* | 6/2020 | Bauer | G06Q 20/204 |
| 2006/0136717 A1 | 6/2006 | Buer et al. | |
| 2010/0275269 A1* | 10/2010 | Vilmos | H04L 63/04 726/28 |
| 2011/0211699 A1* | 9/2011 | Ma | H04L 9/0819 380/278 |
| 2011/0255696 A1* | 10/2011 | Ma | H04L 9/083 380/279 |
| 2011/0280406 A1* | 11/2011 | Ma | H04B 5/02 380/278 |
| 2011/0296182 A1* | 12/2011 | Jia | H04L 63/04 713/168 |
| 2012/0129452 A1* | 5/2012 | Koh | G06Q 20/352 455/41.1 |
| 2012/0130838 A1* | 5/2012 | Koh | G06Q 20/3552 705/26.1 |
| 2012/0130839 A1* | 5/2012 | Koh | G06Q 20/325 705/26.1 |
| 2012/0143769 A1 | 6/2012 | Krishnan et al. | |
| 2012/0246404 A1* | 9/2012 | Malzahn | G06Q 20/341 711/115 |
| 2013/0111546 A1* | 5/2013 | Gargiulo | H04L 63/06 726/1 |
| 2013/0139230 A1* | 5/2013 | Koh | G06Q 20/352 726/5 |
| 2013/0159710 A1* | 6/2013 | Khan | H04L 9/0891 713/168 |
| 2013/0178159 A1* | 7/2013 | Xie | G06Q 20/322 455/41.1 |
| 2013/0212248 A1 | 8/2013 | Neafsey et al. | |
| 2013/0311383 A1 | 11/2013 | Batada et al. | |
| 2014/0006194 A1* | 1/2014 | Xie | G06Q 30/04 705/21 |
| 2014/0031024 A1* | 1/2014 | Xie | G06F 21/57 455/418 |
| 2014/0134981 A1* | 5/2014 | Park | H04W 12/0023 455/411 |
| 2014/0140507 A1* | 5/2014 | Park | H04W 8/245 380/247 |
| 2015/0073996 A1* | 3/2015 | Makhotin | G06Q 20/3552 705/71 |
| 2015/0278800 A1* | 10/2015 | Xie | G06Q 30/0601 705/16 |
| 2015/0288523 A1* | 10/2015 | Burghardt | G06F 21/34 726/20 |
| 2015/0319152 A1* | 11/2015 | Chastain | H04W 4/60 726/4 |
| 2016/0099923 A1* | 4/2016 | Golla | H04W 12/04 713/171 |
| 2016/0275504 A1* | 9/2016 | Koh | G06Q 20/3672 |
| 2017/0068947 A1* | 3/2017 | Xie | G06Q 20/204 |
| 2017/0295158 A1* | 10/2017 | Chastain | H04W 12/04 |
| 2018/0213405 A1* | 7/2018 | Jung | H04L 63/0853 |
| 2019/0172062 A1* | 6/2019 | Koh | G06Q 20/325 |
| 2020/0250652 A1* | 8/2020 | Xie | G06Q 20/40 |
| 2020/0286068 A1* | 9/2020 | Fontaine | G06Q 20/322 |

FOREIGN PATENT DOCUMENTS

| | | |
|---|---|---|
| CN | 103493079 | 1/2014 |
| WO | 2013/067521 | 5/2013 |
| WO | 2013/150333 A1 | 10/2013 |

OTHER PUBLICATIONS

No stated author; Global Platform Card Specification v2.2; 2006; retrieved from the Internet <URL: http://www.win.tue.nl/pinpasjc/docs/GPCardSpec_v2.2.pdf>, pp. 1-375, as printed. (Year: 2006).*

* cited by examiner

STORAGE OF CREDENTIAL SERVICE PROVIDER DATA IN A SECURITY DOMAIN OF A SECURE ELEMENT

CROSS-REFERENCE TO RELATED APPLICATION(S)

This application claims the benefit of prior filed U.S. Provisional Patent Application No. 61/989,209, filed May 6, 2014, which is hereby incorporated by reference herein in its entirety.

TECHNICAL FIELD

This disclosure relates to the storage of credential service provider data in a security domain of a secure element and, more particularly, to the efficient storage of credential service provider data in a security domain of a secure element of an electronic device.

BACKGROUND OF THE DISCLOSURE

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a commerce credential, such as a credit card credential or a public transportation ticket credential, previously provisioned on the device. However, the provisioning of such commerce credentials on an electronic device is often insecure or inefficient.

SUMMARY OF THE DISCLOSURE

This document describes systems, methods, and computer-readable media for efficiently storing credential service provider data in a security domain of a secure element of an electronic device capable of near field communications and/or other wireless communications.

For example, a method may include, prior to an event, storing credential service provider data in a security domain of an electronic device. The method may also include, after the event, establishing a secure communication channel between the security domain and a credential service provider using the stored credential service provider data. The event may include at least one of an end user achieving access to the electronic device and the generation of a request to provision a credential of the credential service provider on the security domain.

As another example, an electronic device may be in communication with a secure element vendor subsystem and a credential service provider. The electronic device may include a secure element that receives credential service provider data from the secure element vendor subsystem and encrypts a key of the secure element with the received credential service provider data. The electronic device may also include a communications component that transmits the encrypted key to the credential service provider.

As yet another example, a method may include provisioning a credential of a credential service provider in a first security domain of a secure element of an electronic device and, in response to the provisioning, creating a second security domain of the secure element.

As yet another example, a secure element vendor system may be in communication with an electronic device. The secure element vendor system may include at least one processor component, at least one memory component, and at least one communications component. The secure element vendor system accesses credential service provider data from a credential service provider, transmits information based on the accessed credential service provider data to a secure element, and provides the secure element to a commercial entity subsystem that incorporates the secure element on an electronic device.

As yet another example, a non-transitory computer-readable medium may include computer-readable instructions recorded thereon for, prior to an event, storing credential service provider data in a security domain of an electronic device and, after the event, transmitting information encrypted with the credential service provider data from the electronic device. The event may include at least one of an end user achieving access to the electronic device and the generation of a request to provision a credential on the security domain.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which.

DETAILED DESCRIPTION OF THE DISCLOSURE

Credential service provider data (e.g., a public key) associated with a particular credential service provider (e.g., a payment network, such as MasterCard or Visa) may be stored in a particular security domain (e.g., a supplemental security domain ("SSD")) of a secure element prior to use of an electronic device including that secure element by an end user in the field (e.g., prior to provisioning a credential from that particular credential service provider in that particular security domain when the secure element is in an electronic device owned and used by an end user). For example, such credential service provider data may be provided to a particular security domain of a secure element by a secure element vendor subsystem during the initialization of the secure element and/or by a commercial entity subsystem that may manufacture the electronic device with the secure element. In some embodiments, a certain amount of data, which may be referred to herein as a "data BLOB" or just as a "BLOB," may be generated and/or stored in the particular security domain of the secure element prior to use of an electronic device including that secure element by an end user in the field. For example, such a BLOB may include at least one SSD key (e.g., a key generated onboard or otherwise specifically for the particular security domain) that may be encrypted with or otherwise transformed by the credential service provider data (e.g., a public key associated with the particular credential service provider). By storing such a BLOB in a particular security domain of a secure element prior to use of that secure element by an end user of an electronic device in the field, the amount of time required for provisioning a new credential in that security domain may be reduced and/or the amount of information required to be communicated by the secure element for provisioning a new credential in that security domain may be reduced. In some embodiments, once a credential is provisioned in a pre-existing security domain of a secure element, a new security domain may be automatically generated in the secure element, where such a new security domain may be generated to include a BLOB, and where such a BLOB may include SSD key data that may be encrypted with or otherwise transformed by credential service provider data that was also associated with the pre-existing security domain most recently personalized with a provisioned credential.

Figure 1:
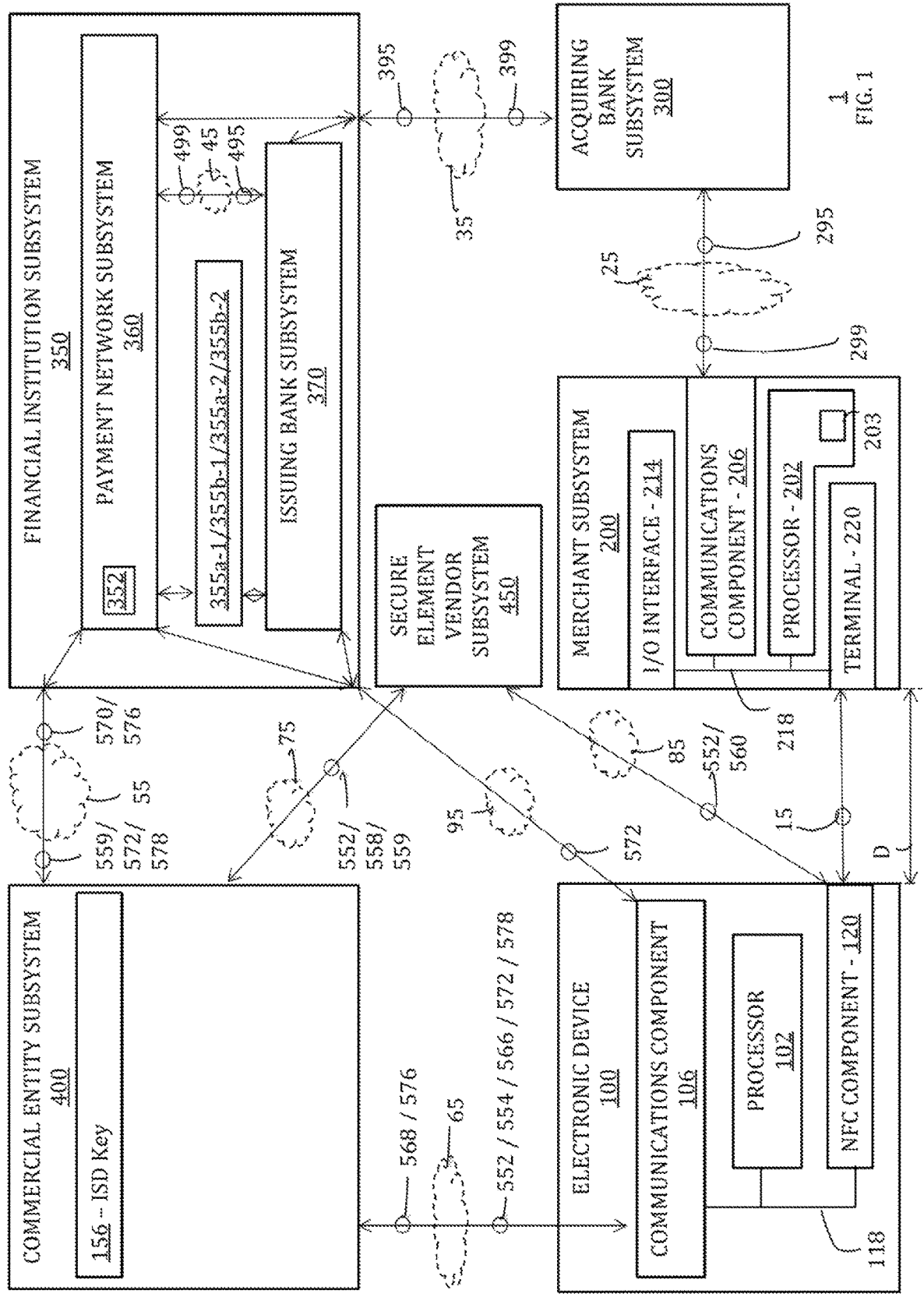
FIG. 1 is a schematic view of an illustrative system for storing credential service provider data in a security domain of a secure element of an electronic device.
Figure 2:
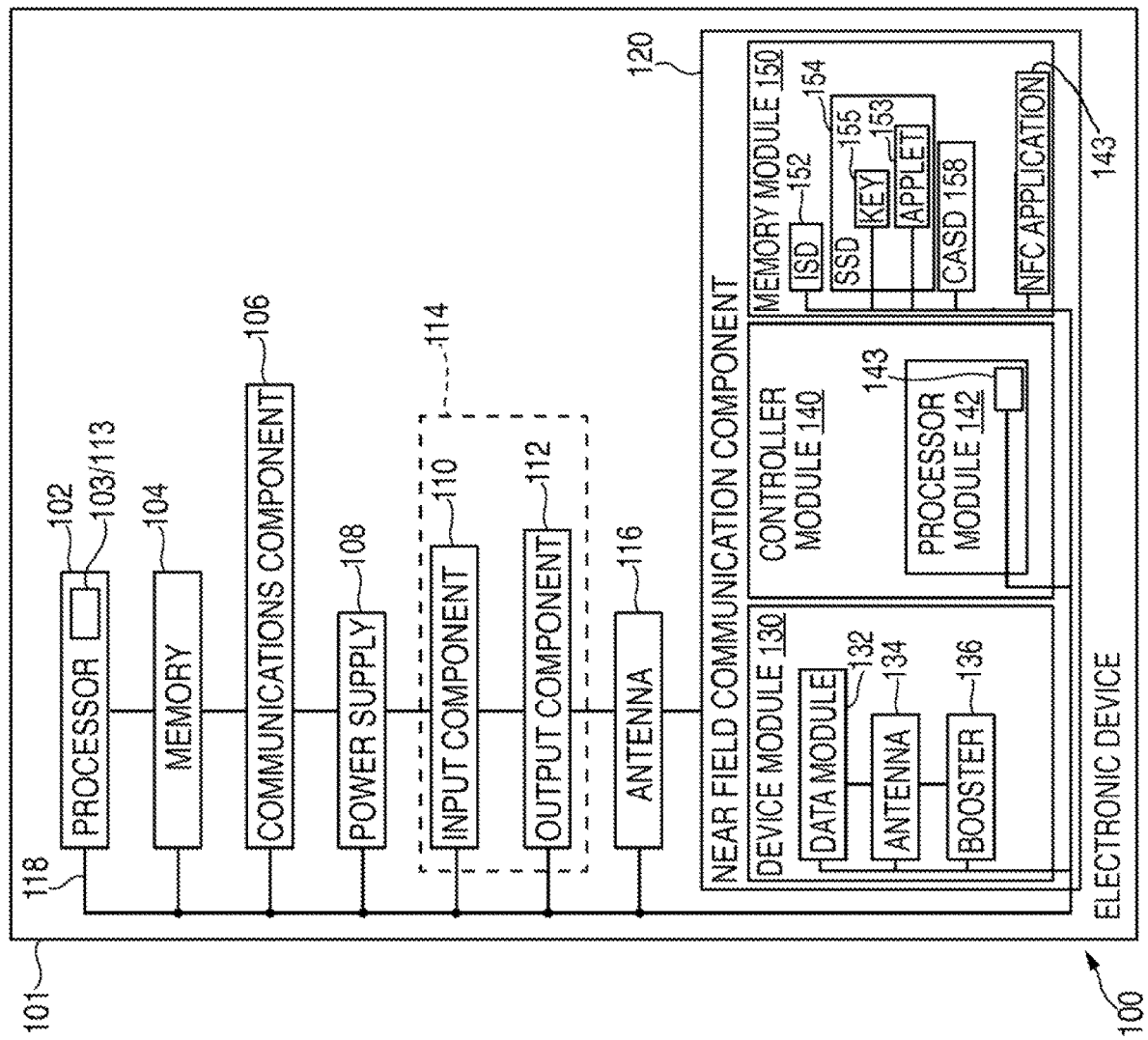
FIG. 2 is a more detailed schematic view of the electronic device of the system of FIG. 1.
Figure 3:
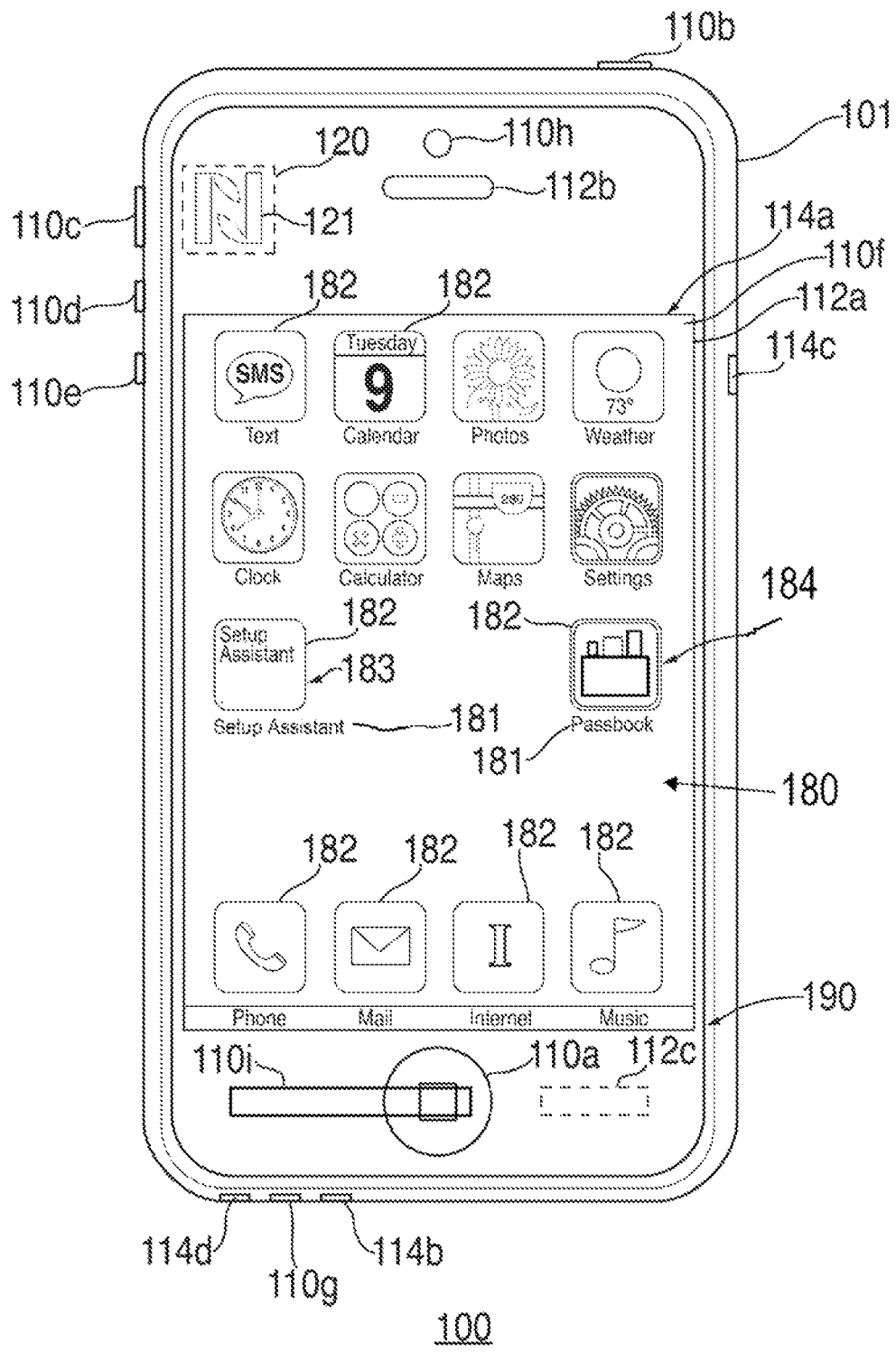
FIG. 3 is a front view of the electronic device of FIGS. 1 and 2.
Figure 4:
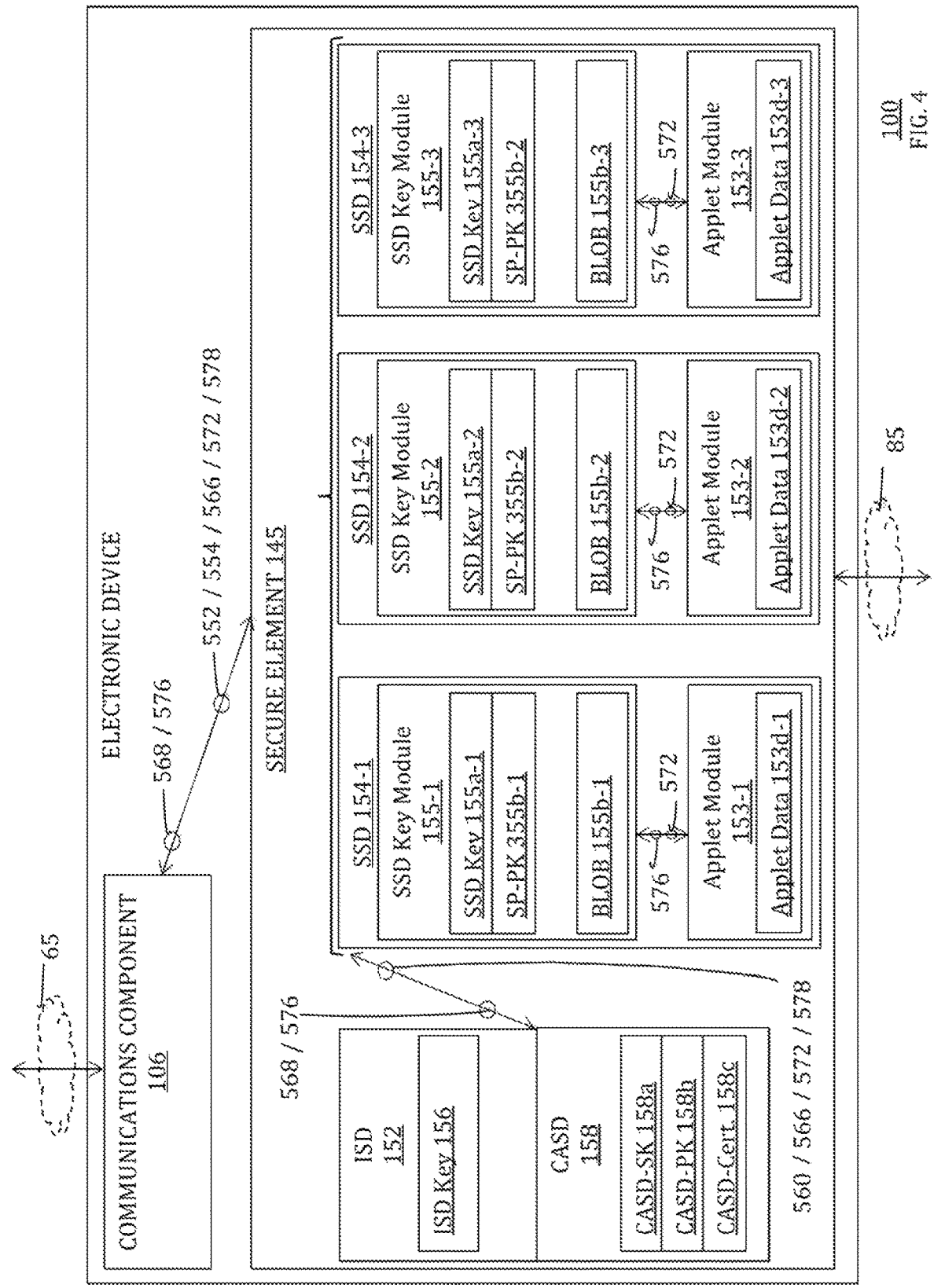
FIG. 4 is another more detailed schematic view of the electronic device of FIGS. 1-3.
Figure 5:
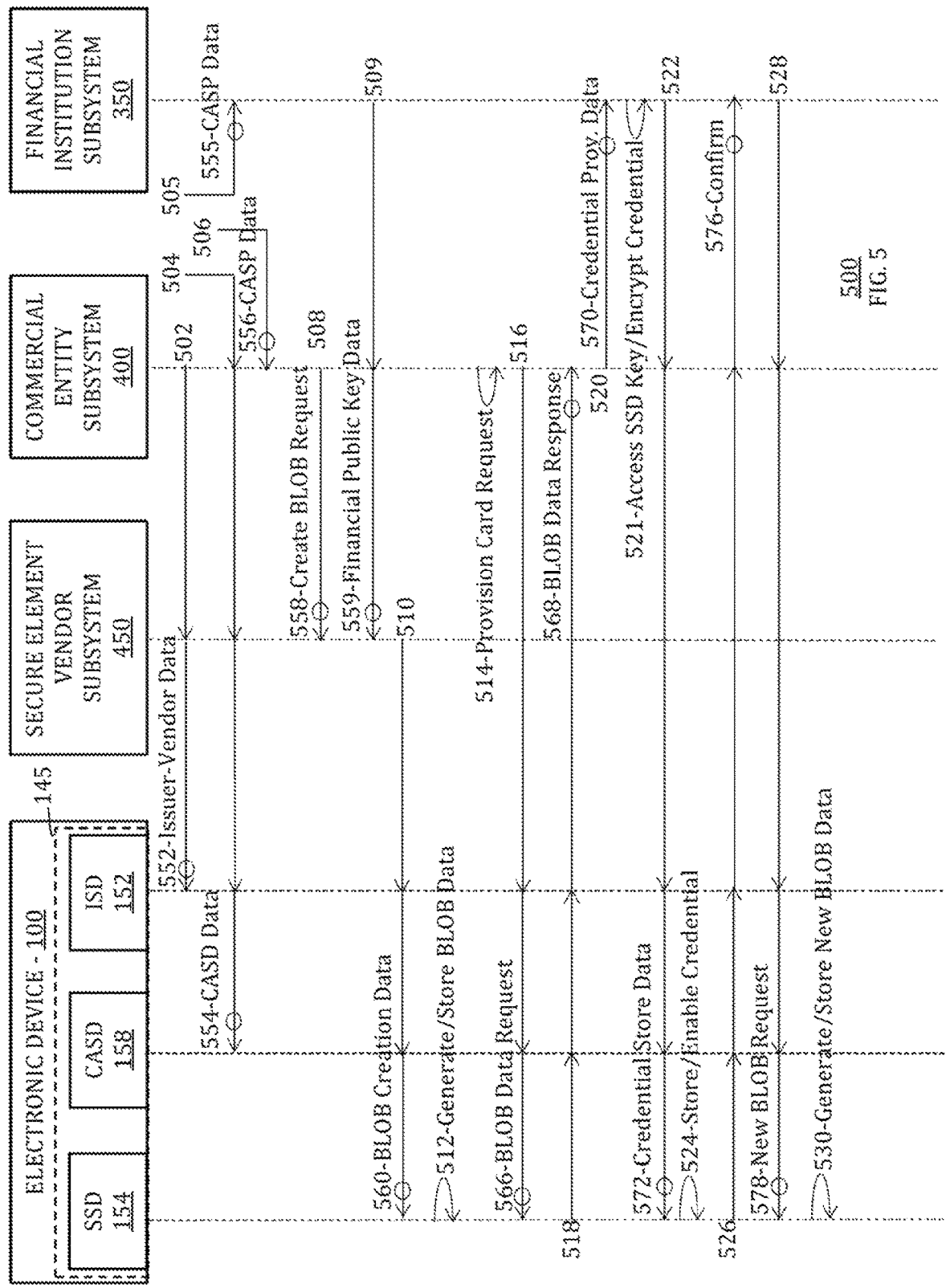
FIGS. 5-7 are flowcharts of illustrative processes for storing credential service provider data in a security domain of a secure element of an electronic device.
Figure 6:
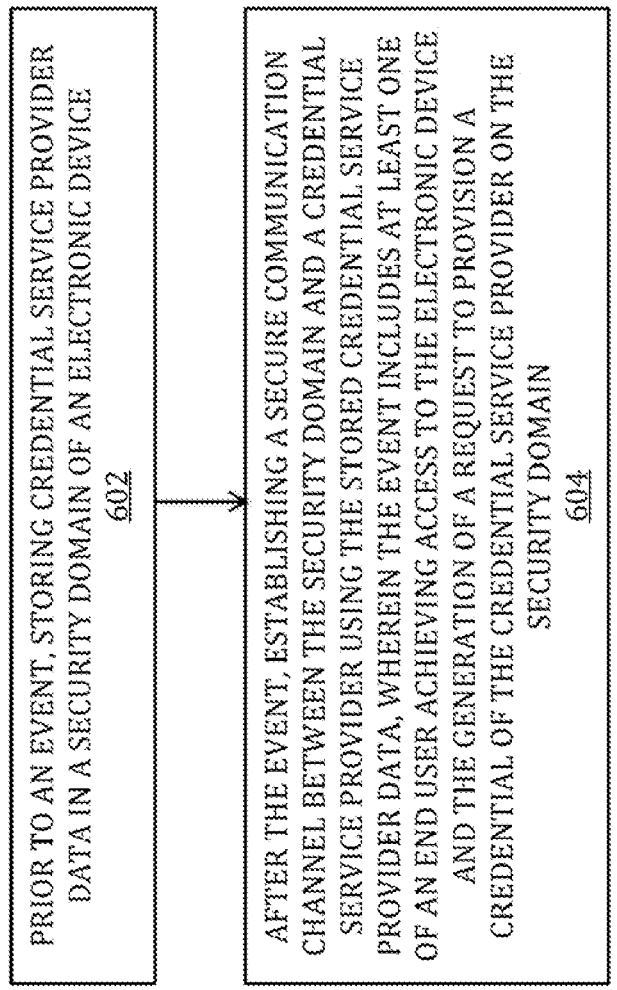
Figure 7:
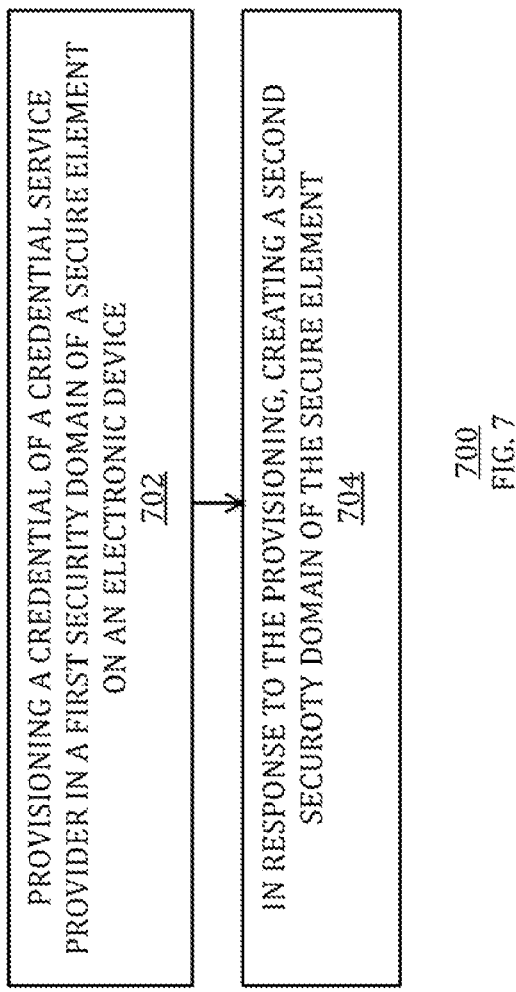

FIG. 1 shows a system 1 in which credential service provider data may be stored in a security domain of a secure element of an electronic device 100 by a secure element vendor subsystem 450 (e.g., in conjunction with a commercial entity subsystem 400) to enable the secure provisioning of one or more credentials on electronic device 100 by a financial institution subsystem 350 (e.g., in conjunction with commercial entity subsystem 400), and in which such credentials may be used by electronic device 100 for conducting a commercial transaction with a merchant subsystem 200 and an associated acquiring bank subsystem 300. FIGS. 2-4 show further details with respect to particular embodiments of electronic device 100 of system 1, while FIGS. 5-7 are flowcharts of illustrative processes for storing credential service provider data in a security domain of a secure element of electronic device 100 in the context of system 1.

Description of FIG. 1. FIG. 2, FIG. 3. and FIG. 4

FIG. 1 is a schematic view of an illustrative system 1 that may allow for the storage of credential service provider data in a security domain of a secure element of an electronic device. For example, as shown in FIG. 1, system 1 may include an end-user electronic device 100 as well as a commercial entity subsystem 400 and a secure element vendor subsystem 450 for storing credential service provider data in a security domain of a secure element of electronic device 100. Moreover, as shown in FIG. 1, system 1 may also include a financial institution subsystem 350 for securely provisioning credentials on electronic device 100 (e.g., via commercial entity subsystem 400). Moreover, as shown in FIG. 1, system 1 may also include a merchant subsystem 200 for receiving contactless proximity-based communications 15 (e.g., near field communications) from electronic device 100 based on such provisioned credentials, as well as an acquiring bank subsystem 300 that may utilize such contactless proximity-based communications 15 for completing a transaction with financial institution subsystem 350.

As shown in FIG. 2, and as described in more detail below, electronic device 100 may include a processor 102, memory 104, communications component 106, power supply 108, input component 110, output component 112, antenna 116, and near field communication ("NFC") component 120, where input component 110 and output component 112 may sometimes be a single I/O component or I/O interface 114, such as a touch screen, that may receive input information through a user's touch of a display screen and that may also provide visual information to a user via that same display screen. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. Processor 102 may be used to run one or more applications, such as an application 103 and/or an application 113. Each one of applications 103 and 113 may include, but is not limited to, one or more operating system applications, firmware applications, media playback applications, media editing applications, communication applications, NFC applications, biometric feature-processing applications, or any other suitable applications. For example, processor 102 may load an application 103/113 as a user interface program to determine how instructions or data received via an input component 110 or other component of device 100 may manipulate the way in which information may be stored and/or provided to the user via an output component 112. As one example, application 103 may be an operating system application while application 113 may be a third party application (e.g., an application associated with a merchant of merchant subsystem 200 and/or an application associated with a financial institution of financial institution subsystem 350 and/or an application generated and/or maintained by commercial entity subsystem 400).

NFC component 120 may be any suitable proximity-based communication mechanism that may enable any suitable contactless proximity-based transactions or communications 15 between electronic device 100 and merchant subsystem 200 (e.g., a merchant payment terminal 220 of merchant subsystem 200). NFC component 120 may include any suitable modules for enabling contactless proximity-based communication 15 between electronic device 100 and subsystem 200. As shown in FIG. 2, for example, NFC component 120 may include an NFC device module 130, an NFC controller module 140, and an NFC memory module 150. NFC device module 130 may include an NFC data module 132, an NFC antenna 134, and an NFC booster 136. NFC controller module 140 may include at least one NFC processor module 142 that may be used to run one or more applications, such as an NFC low power mode application or wallet application or cryptography application 143 that may help dictate a function of NFC component 120. NFC memory module 150 may operate in conjunction with NFC device module 130 and/or NFC controller module 140 to allow for NFC communication 15 between electronic device 100 and merchant subsystem 200. NFC memory module 150 may be tamper resistant and may provide at least a portion of a secure element 145 (see, e.g., FIG. 4). For example, such a secure element 145 may be configured to provide a tamper-resistant platform (e.g., as a single or multiple chip secure microcontroller) that may be capable of securely hosting applications and their confidential and cryptographic data (e.g., applets 153 and keys 155) in accordance with rules and/or security requirements that may be set forth by a set of well-identified trusted authorities (e.g., an authority of financial institution subsystem 350 and/or an industry standard, such as GlobalPlatform).

As shown in FIGS. 2 and 4, NFC memory module 150 may include one or more of an issuer security domain ("ISD") 152, at least one supplemental security domain ("SSD") 154 (e.g., a service provider security domain ("SPSD"), a trusted service manager security domain ("TSMSD"), etc.), and a controlling authority security domain ("CASD") 158, one or more of which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, etc.) on electronic device 100 (e.g., via communications component 106), for credential content management, and/or for security domain management. As shown in FIG. 4, for example, and as described in more detail below with respect to FIG. 5, ISD 152 may include one or more ISD keys (e.g., at least one ISD key 156) that may also be known to a trusted service manager associated with that security domain (e.g., commercial entity subsystem 400, as shown in FIG. 1).

A specific supplemental security domain ("SSD") 154 may be associated with a particular TSM (e.g., a particular financial institution subsystem 350) and at least one specific commerce credential (e.g., a specific credit card credential or a specific public transit card credential) that may provide specific privileges or payment rights to electronic device 100. Each SSD 154 may have its own SSD key module 155 and at least one of its own credential applications or credential applets or applet modules 153 (e.g., a Java card applet instance) associated with a particular commerce credential. As shown in FIG. 4, for example, and as described in more detail below with respect to FIG. 5, secure element 145 may include at least three SSDs 154 (e.g., first SSD 154-1, second SSD 154-2, and third SSD 154-3), each of which may include an SSD key module 155 (e.g., SSD key module 155-1 of first SSD 154-1, SSD key module 155-2 of second SSD 154-2, and SSD key module 155-3 of third SSD 154-3) and an applet module 153 (e.g., applet module 153-1 of first SSD 154-1, applet module 153-2 of second SSD 154-2, and applet module 153-3 of third SSD 154-3). Each SSD key module 155 may be configured to include and/or may be configured to generate and/or may be configured to access at least one SSD key 155a (e.g., SSD key 155a-1 of SSD key module 155-1 of first SSD 154-1, SSD key 155a-2 of SSD key module 155-2 of second SSD 154-2, and SSD key 155a-3 of SSD key module 155-3 of third SSD 154-3) and/or at least one service provider public key ("SP-PK") 355b (e.g., SP-PK 355b-1 of SSD key module 155-1 of first SSD 154-1, SP-PK 355b-2 of SSD key module 155-2 of second SSD 154-2, and SP-PK 355b-2 of SSD key module 155-3 of third SSD 154-3). Additionally or alternatively, as also shown in FIG. 4, for example, and as described in more detail below with respect to FIG. 5, each SSD key module 155 may be configured to include and/or may be configured to generate and/or may be configured to access at least one BLOB 155b (e.g., BLOB 155b-1 of SSD key module 155-1 of first SSD 154-1, BLOB 155b-2 of SSD key module 155-2 of second SSD 154-2, and BLOB 155b-3 of SSD key module 155-3 of third SSD 154-3). Moreover, as shown in FIG. 4, for example, and as described in more detail below with respect to FIG. 5, each credential applet module 153 may be populated with its own applet data 153d (e.g., applet data 153d-1 of applet module 153-1 of first SSD 154-1, applet data 153d-2 of applet module 153-2 of second SSD 154-2, and applet data 153d-3 of applet module 153-3 of third SSD 154-3), where a credential applet module 153 may need to be activated to enable its associated commerce credential for use by NFC device module 130 as an NFC communication 15 between electronic device 100 and merchant subsystem 200.

CASD 158 may be a special purpose security domain that may be configured to serve as a third-party on-element root of trust. An associated application may be configured to provide on-element confidential key generation as a global service to other applications and to a specific management layer (e.g., a GlobalPlatform management layer). The confidential key material that may be used within CASD 158 may be configured such that it cannot be inspected or modified by any entity, including an issuer of secure element 145. As shown in FIG. 4, for example, and as described in more detail below with respect to FIG. 5, CASD 158 may be configured to include and/or may be configured to generate a CASD private key ("CASD-SK") 158a, a CASD public key ("CASD-PK") 158b, and/or a CASD certificate ("CASD-Cert.") 158c.

As shown in FIG. 3, and as described below in more detail, a specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 3, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Setup Assistant" textual indicator 181 (i.e., specific icon 183) is selected, device 100 may launch or otherwise access a specific setup application and may display screens of a specific user interface that may include one or more tools or features for interacting with device 100 in a specific manner according to that application. As another example, when the specific icon 182 labeled with a "Passbook" textual indicator 181 (i.e., specific icon 184) is selected, device 100 may launch or otherwise access a specific "Passbook" or "wallet" application and may display screens of a specific user interface that may include one or more tools or features for interacting with device 100 in a specific manner according to that application.

Referring back to system 1 of FIG. 1, merchant subsystem 200 may include a reader or terminal 220 for detecting, reading, or otherwise receiving NFC communication 15 from electronic device 100 (e.g., when electronic device 100 comes within a certain distance or proximity D of terminal 220). Accordingly, it is noted that NFC communication 15 between merchant terminal 220 and electronic device 100 may occur wirelessly and, as such, may not require a clear "line of sight" between the respective devices. NFC device module 130 may be passive or active. When passive, NFC device module 130 may only be activated when within a response range D of a suitable terminal 220 of merchant subsystem 200. For instance, terminal 220 of merchant subsystem 200 may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information, such as may be provided by applet data 153d of an activated/enabled applet 153) via NFC data module 132, via antenna 116 or antenna 134, to terminal 220 of merchant subsystem 200 as NFC communication 15. When active, NFC device module 130 may incorporate or otherwise have access to a power source local to electronic device 100 (e.g., power supply 108) that may enable shared antenna 116 or NFC-specific antenna 134 to actively transmit suitable NFC communication information (e.g., credit card credential information, such as may be provided by applet data 153d of an activated/enabled applet 153) via NFC data module 132, via antenna 116 or antenna 134, to terminal 220 of merchant subsystem 200 as NFC communication 15, rather than reflect radio frequency signals, as in the case of a passive NFC device module 130. As also shown in FIG. 1, and as described below in more detail, merchant subsystem 200 may also include a merchant processor component 202 that may be the same as or similar to a processor component 102 of electronic device 100, a merchant application 203 that may be the same as or similar to an application 103/113 of electronic device 100, a merchant communications component 206 that may be the same as or similar to a communications component 106 of electronic device 100, a merchant I/O interface 214 that may be the same as or similar to an I/O interface 114 of electronic device 100, a merchant bus 218 that may be the same as or similar to a bus 118 of electronic device 100, a merchant memory component (not shown) that may be the same as or similar to a memory component 104 of electronic device 100, and/or a merchant power supply component (not shown) that may be the same as or similar to a power supply component 108 of electronic device 100.

When NFC component 120 is appropriately enabled and activated to communicate NFC communication 15 to merchant subsystem 200 with commerce credential data associated with an enabled credential of device 100 (e.g., commerce credential data, such as may be provided by applet data 153d of an activated/enabled applet 153 of SSD 154 of NFC component 120), acquiring bank subsystem 300 may utilize such commerce credential data of NFC communication 15 for completing a commercial or financial transaction with financial institution subsystem 350. Financial institution subsystem 350 may include at least one payment network subsystem 360 (e.g., a payment card association or a credit card association) and/or at least one issuing bank subsystem 370. For example, issuing bank subsystem 370 may be a financial institution that assumes primary liability for a consumer's capacity to pay off debts they incur with a specific credential. Each specific credential may be associated with a specific payment card that may be electronically linked to an account or accounts of a particular user. Various types of payment cards may be suitable, including credit cards, debit cards, charge cards, stored-value cards, fleet cards, gift cards, and the like. The commerce credential of a specific payment card may be provisioned on electronic device 100 by issuing bank subsystem 370 for use in an NFC communication 15 with merchant subsystem 200. Each credential may be a specific brand of payment card that may be branded by a payment network subsystem 360. Payment network subsystem 360 may be a network of various issuing banks 370 and/or various acquiring banks that may process the use of payment cards (e.g., commerce credentials) of a specific brand. Alternatively or additionally, certain credentials that may be provisioned on device 100 for use in a commercial or financial transaction may be electronically linked to or otherwise associated with an account or accounts of a particular user, but not associated with any payment card. For example, a bank account or other financial account of a user may be associated with a credential provisioned on device 100 but may not be associated with any payment card.

Payment network subsystem 360 and issuing bank subsystem 370 may be a single entity or separate entities. For example, American Express may be both a payment network subsystem 360 and an issuing bank subsystem 370. In contrast, Visa and MasterCard may be payment network subsystems 360, and may work in cooperation with issuing bank subsystems 370, such as Chase, Wells Fargo, Bank of America, and the like. Financial institution subsystem 350 may include at least two payment network subsystems 360 (only one payment network subsystem 360 may be shown in FIG. 1 for clarity), where each payment network subsystem 360 may work in cooperation with two or more issuing bank subsystems 370. Alternatively, system 1 may include two or more distinct financial institution subsystems 350 (only one financial institution subsystem 350 may be shown in FIG. 1 for clarity), where each financial institution subsystem 350 may include a particular payment network subsystem 360 and may also include at least one issuing bank subsystem 370 that may work in cooperation with that particular payment network subsystem 360. Alternatively or additionally, financial institution subsystem 350 may also include one or more acquiring banks, such as acquiring bank subsystem 300. For example, acquiring bank subsystem 300 may be the same entity as an issuing bank subsystem 370. One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100.

To facilitate transactions within system 1, one or more commerce credentials may be provisioned on electronic device 100. As shown in FIG. 1, commercial entity subsystem 400 may be provided within system 1, where commercial entity subsystem 400 may be configured to provide a new layer of security and/or to provide a more seamless user experience when it is being determined whether or not to provision a credential from financial institution subsystem 350 on device 100. Commercial entity subsystem 400 may be provided by a specific commercial entity that may offer various services to a user of device 100. As just one example, commercial entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™, iPhone™, or the like). Additionally or alternatively, commercial entity subsystem 400 may be provided by a network operator (e.g., a mobile network operator, such as Verizon or AT&T, which may have a relationship with a user of device 100 (e.g., as a provider of a data plan for enabling the communication of data over a certain communication path and/or using a certain communication protocol with device 100)).

The commercial entity that may provide, manage, or at least partially control commercial entity subsystem 400 may also provide different users with their own personalized accounts for using the services offered by that commercial entity. Each user account with the commercial entity may be associated with a specific personalized user ID and password that a user may use to log-in to their account with the commercial entity. Each user account with the commercial entity may also be associated with or have access to at least one commerce credential that can then be used by the user for purchasing services or products offered by the commercial entity. For example, each Apple ID user account may be associated with at least one credit card of a user associated with that Apple ID, such that the credit card may then be used by the user of that Apple ID account for procuring services from Apple's iTunes™ Store, the Apple App Store™, the Apple iCloud™ Service, and the like. The commercial entity that may provide, manage, or at least partially control commercial entity subsystem 400 (e.g., Apple Inc.) may be distinct and independent from any financial entity of financial institution subsystem 350. For example, the commercial entity that may provide, manage, or at least partially control commercial entity subsystem 400 may be distinct and independent from any payment network subsystem 360 and/or from any issuing bank subsystem 370 that may furnish and/or manage any credit card or other commerce credential associated with a user account of the commercial entity. Similarly, the commercial entity that may provide, manage, or at least partially control commercial entity subsystem 400 may be distinct and independent from any payment network subsystem 360 and/or from any issuing bank subsystem 370 that may furnish and/or manage any commerce credential to be provisioned on user device 100. Such a commercial entity may leverage the known commerce credential information associated with each of its user accounts and/or any suitable information that commercial entity subsystem 400 may determine about device 100 in order to more securely determine with commercial entity subsystem 400 whether a specific credential offered by financial institution subsystem 350 ought to be provisioned on a user device 100 or removed therefrom. Additionally or alternatively, such a commercial entity may leverage its ability to configure or control various components of device 100 (e.g., software and/or hardware components of device 100 when that commercial entity at least partially produces or manages device 100) in order to provide a more seamless user experience for a user of device 100 when he or she wants to provision a credential offered by financial institution subsystem 350 on device 100 or remove a credential therefrom.

Commercial entity subsystem 400 may be a secure platform system and, although not shown in FIG. 1, may include a secure mobile platform ("SMP") broker component, an SMP trusted services manager ("TSM") component, an SMP crypto services component, an identity management system ("IDMS") component, a fraud system component, a hardware security module ("HSM") component, and/or a store component, as described in more detail below. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience when provisioning credentials on device 100.

A third-party vendor may generate at least a portion of a secure element that may be provisioned on electronic device 100. As shown in FIG. 1, secure element vendor subsystem 450 may be provided within system 1, where secure element vendor subsystem 450 may be configured to fabricate at least a portion of secure element 145 that may later be embedded or otherwise included as a part of electronic device 100 (e.g., by a manufacturer of the majority of device 100, such as commercial entity subsystem 400 (e.g., Apple Inc.)). Secure element vendor subsystem 450 may be provided by a specific vendor entity that may offer various services and/or products to a manufacturer of device 100. As just one example, secure element vendor subsystem 450 may be provided NXP Semiconductors of Eindhoven, Netherlands. Secure element vendor subsystem 450 may be a secure platform system and, although not shown in FIG. 1, may include a secure mobile platform ("SMP") broker component, an SMP trusted services manager ("TSM") component, an SMP crypto services component, an identity management system ("IDMS") component, a fraud system component, a hardware security module ("HSM") component, and/or a store component, as described in more detail below. One, some, or all components of secure element vendor subsystem 450 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of secure element vendor subsystem 450 may be managed by, owned by, at least partially controlled by, and/or otherwise provided by a single vendor entity (e.g., NXP Semiconductor) that may be distinct and/or independent from an entity that may manage, own, control, and/or otherwise provide commercial entity subsystem 400 (e.g., Apple Inc.). In other embodiments, one, some, or all components of secure element vendor subsystem 450 may be managed by, owned by, at least partially controlled by, and/or otherwise provided by at least a portion of commercial entity subsystem 400. Additionally or alternatively, one, some, or all components of secure element vendor subsystem 450 may be managed by, owned by, at least partially controlled by, and/or otherwise provided by a single vendor entity that may be distinct and/or independent from an entity that may manage, own, control, and/or otherwise provide financial institution subsystem 350. The components of secure element vendor subsystem 450 may interact with each other and collectively with commercial entity subsystem 400, financial institution subsystem 350, and/or electronic device 100 for preparing at least a portion of secure element 145 for use on electronic device 100.

Description of FIG. 5

FIG. 5 is a flowchart of an illustrative process 500 for storing credential service provider data in a security domain of a secure element of an electronic device. Process 500 is shown being implemented by the various elements of system 1 of FIGS. 1-4 (e.g., electronic device 100, financial institution subsystem 350, commercial entity subsystem 400, and secure element vendor subsystem 450). However, it is to be understood that process 500 may be implemented using any other suitable components or subsystems.

Process 500 may begin at step 502, where issuer-vendor data 552 may be provided on an electronic device. For example, as shown in FIG. 4, ISD 152 with at least one ISD key 156 may be provided on secure element 145 of NFC component 120 of electronic device 100 by at least a portion of issuer-vendor data 552 (e.g., data from secure element vendor subsystem 450 and/or from commercial entity subsystem 400), where such issuer-vendor data 552 may be utilized by NFC component 120 for initially configuring secure element 145 to manage the provisioning of one or more commerce credentials on secure element 145 by a remote subsystem. ISD key 156 may also remain accessible to commercial entity subsystem 400 (e.g., a copy of ISD key 156 may be stored on or otherwise accessed by commercial entity subsystem 400, as shown in FIG. 1). ISD key 156 may be private and known to ISD 152 and commercial entity subsystem 400 but may not be publicly accessible by other components or entities. In such embodiments, future data to be communicated between secure element 145 and commercial entity subsystem 400 (e.g., data 566, data 568, data 572, data 576, and/or data 578 described below) may first be encrypted with ISD key 156, such that the encrypted data may not be accessible by any entity that is not privy to ISD key 156 (e.g., any entity other than ISD 152 and commercial entity subsystem 400). Commercial entity subsystem 400 may be considered a secure element issuer trusted service manager ("SEI-TSM"), and at least a portion of such issuer-vendor data 552 may be provided by commercial entity subsystem 400 to electronic device 100 via communications path 65 of FIG. 1. For example, as shown in FIGS. 1 and 4, communications component 106 of electronic device 100 may be configured to communicate such issuer-vendor data 552 with commercial entity subsystem 400 using any suitable communications protocol over any suitable communications path 65. Alternatively or additionally, at least a portion of such issuer-vendor data 552 may be provided by secure element vendor subsystem 450 to secure element 145 of electronic device 100 via communications path 85 of FIG. 1. For example, as shown in FIGS. 1 and 4, electronic device 100 may be configured to communicate such issuer-vendor data 552 with secure element vendor subsystem 450 using any suitable communications protocol over any suitable communications path 85, where at least a portion of such issuer-vendor data 552 may be provided to secure element vendor subsystem 450 from commercial entity subsystem 400 via any suitable communications path 75 of FIG. 1 using any suitable communications protocol.

Process 500 may also include step 504, where controlling authority security domain ("CASD") data 554 may be provided on an electronic device. For example, CASD 158, which may be configured to include and/or may be configured to generate CASD private key ("CASD-SK") 158a, CASD public key ("CASD-PK") 158b, and/or CASD certificate ("CASD-Cert.") 158c, may be provided on secure element 145 of NFC component 120 of electronic device 100 by at least a portion of CASD data 554. CASD 158 may be utilized by NFC component 120 as a special purpose security domain that may be configured to serve as a third-party on-element root of trust, and an associated application (e.g., CASD Certificate 158c) may be configured to provide on-element confidential key generation as a global service to other applications and to a specific management layer (e.g., a GlobalPlatform management layer). The confidential key material that may be used within CASD 158 may be configured such that CASD 158 cannot be inspected or modified by certain entities, including an issuer of secure element 145 (e.g., commercial entity subsystem 400 and/or secure element vendor subsystem 450). For example, CASD data 554 may be introduced into secure element 145 by a trustable third party (not shown), such as any suitable controlling authority ("CA"), where CASD 158 provided by CASD data 554 may be configured to conform to the specifications of any suitable standard (e.g., "GlobalPlatform's Card Specification Version 2.2," which is hereby incorporated by reference herein in its entirety). In some embodiments, at least a portion or all of CASD data 554 (e.g., at least one or more of CASD private key ("CASD-SK") 158a, CASD public key ("CASD-PK") 158b, and/or CASD certificate ("CASD-Cert.") 158c) may be provided on secure element 145 by secure element vendor subsystem 450, which may be done prior to secure element 145 being combined with other components (e.g., processor 102) for forming electronic device 100 (e.g., by commercial entity subsystem 400 as a device manufacturer). CASD 158 may be configured to provide a service provider's security domain ("SPSD") on secure element 145 with an independent service interface, which may include certificate authentication, signature, data decryption, and the like. For example, as described below, an SSD 154 may be an SPSD that may be controlled or otherwise managed by a financial institution subsystem 350 as a service provider of that SSD 154, such that the financial institution subsystem 350 may be considered a service provider trusted service manager ("SP-TSM") for that SSD 154.

CASD data 554 may be provisioned on secure element 145 at step 504 before or after secure element 145 may be provisioned on device 100. Additionally or alternatively, CASD data 554 may be provisioned on secure element 145 at step 504 before, at least partially concurrently with, or after issuer-vendor data 552 may be provisioned on secure element 145 at step 502. For example, CASD-SK 158a may be provisioned on secure element 145 before any BLOB data is provided or otherwise generated on secure element 145. In some embodiments, CASD data 554 may be provisioned on secure element 145 of device 100 via commercial entity subsystem 400, where CASD data 554 may first be encrypted with ISD key(s) 156 by commercial entity subsystem 400, such that the encrypted CASD data 554 may not be accessible by any entity that is not privy to such ISD key(s) (e.g., any entity other than ISD 152 and commercial entity subsystem 400). In such embodiments, CASD data 554 may be provided by commercial entity subsystem 400 to electronic device 100 via communications path 65 of FIG. 1. For example, as shown in FIGS. 1 and 4, communications component 106 of electronic device 100 may be configured to receive such CASD data 554 via commercial entity subsystem 400 using any suitable communications protocol over any suitable communications path 65, where encrypted CASD data 554 may be provided to ISD 152, decrypted with ISD key(s) 156, and then stored on secure element 145 as CASD 158. Alternatively, CASD data 158 may be at least partially injected into secure element 145 by secure element vendor subsystem 450 (e.g., at step 502 as a portion of issuer-vendor data), such as alternatively to at step 504).

Similarly, process 500 may also include step 505, where at least a portion of CASD data 554 and/or any other suitable CA data may be provided to financial institution subsystem 350 as controlling authority service provider ("CASP") data 555. For example, like CASD data 554, CASP data 555 may be configured to include and/or may be configured to generate a CASP private key ("CASP-SK"), a CASP public key ("CASP-PK"), and/or a CASP certificate ("CASP-Cert.") at financial institution subsystem 350 (not shown in FIG. 1). CASP data 555 may be introduced into financial institution subsystem 350 at step 505 by a trustable third party (not shown), such as any suitable controlling authority ("CA"), which may be the same as the party that introduced CASD data 554 into secure element 145 at step 504. CASP data 555 may be introduced into financial institution subsystem 350 at step 505 before or after secure element 145 may be provisioned on device 100. Additionally or alternatively, CASP data 555 may be introduced into financial institution subsystem 350 at step 505 before, at least partially concurrently with, or after CASD data 554 may be provisioned on secure element 145 at step 504. CASP data 555 may be configured to conform to the specifications of any suitable standard (e.g., "GlobalPlatform's Card Specification Version 2.2," which is hereby incorporated by reference herein in its entirety). CASP data 555 may be utilized by financial institution subsystem 350 to enable financial institution subsystem 350 to authenticate, sign, unsign, encode, decode, encrypt, decrypt, and/or otherwise securely transform any data to be communicated between financial institution subsystem 350 and secure element 145 of electronic device 100, whereas CASD data 554 may be similarly utilized by secure element 145 of electronic device 100 to enable electronic device 100 to authenticate, sign, unsign, encrypt, decrypt, and/or otherwise securely transform any data to be communicated between financial institution subsystem 350 and secure element 145 of electronic device 100, such that the communicated data between secure element 145 and financial institution subsystem 350 may be protected from abuse by commercial entity subsystem 400 or any other entity that may be relied on as a conduit for such communicated data.

Additionally or alternatively, process 500 may also include step 506, where at least a portion of CASD data 554 and/or any other suitable CA data may be provided to commercial entity subsystem 400 as controlling authority service provider ("CASP") data 556. For example, like CASD data 554, CASP data 556 may be configured to include and/or may be configured to generate a CASP private key ("CASP-SK"), a CASP public key ("CASP-PK"), and/or a CASP certificate ("CASP-Cert.") at commercial entity subsystem 400. CASP data 556 may be introduced into commercial entity subsystem 400 at step 506 by a trustable third party (not shown), such as any suitable controlling authority ("CA"), which may be the same as the party that introduced CASD data 554 into secure element 145 at step 504. CASP data 556 may be introduced into commercial entity subsystem 400 at step 506 before or after secure element 145 may be provisioned on device 100. Additionally or alternatively, CASP data 556 may be introduced into commercial entity subsystem 400 at step 506 before, at least partially concurrently with, or after CASD data 554 may be provisioned on secure element 145 at step 504. CASP data 556 may be configured to conform to the specifications of any suitable standard (e.g., "GlobalPlatform's Card Specification Version 2.2," which is hereby incorporated by reference herein in its entirety). CASP data 556 may be utilized by commercial entity subsystem 400 to enable commercial entity subsystem 400 to authenticate, sign, unsign, encode, decode, encrypt, decrypt, and/or otherwise securely transform any data to be communicated between commercial entity subsystem 400 and secure element 145 of electronic device 100, whereas CASD data 554 may be similarly utilized by secure element 145 of electronic device 100 to enable electronic device 100 to authenticate, sign, unsign, encrypt, decrypt, and/or otherwise securely transform any data to be communicated between commercial entity subsystem 400 and secure element 145 of electronic device 100, such that the communicated data between secure element 145 and commercial entity subsystem 400 may be protected from abuse by secure element vendor subsystem 450 or any other entity that may be otherwise privy to ISD key(s) 156.

At step 508, commercial entity subsystem 400 or any other suitable entity may generate and transmit a create BLOB request 558 to secure element vendor subsystem 450 (e.g., to an HSM component of secure element vendor subsystem 450) in order to initiate the creation of at least one BLOB 155b in at least one SSD 154 of secure element 145. Step 508 may occur in advance of providing secure element 145 on an electronic device 100 and/or in advance of providing an electronic device 100 with secure element 145 to an end user (e.g., where an end user may provision a credential on secure element 145 and/or use such a provisioned credential in a financial transaction). For example, create BLOB request 558 may include any suitable data that may be generated by commercial entity subsystem 400 and/or by any other suitable entity, and then used by secure element vendor subsystem 450 or any other suitable entity in order to initiate the generation and/or storage of BLOB 155b-1 in SSD key module 155-1 of first SSD 154-1 and/or to initiate the generation and/or storage of BLOB 155b-2 in SSD key module 155-2 of second SSD 154-2. For example, create BLOB request 558 may include any suitable data indicative of a particular payment network subsystem 360 (e.g., Visa or MasterCard) of financial institution subsystem 350 that is associated with the BLOB to be created (e.g., the particular payment network subsystem 360 that may provision a commerce credential (e.g., applet data 153d) in the SSD 154 that is to receive the BLOB 155b to be created).

In some embodiments, in response to receiving such a create BLOB request 558, secure element vendor subsystem 450 may access any suitable key or set of keys from financial institution subsystem 350 as financial public key data 559 at step 509, where such financial public key data 559 may be used to at least partially create a BLOB 155b requested at step 508. As shown in FIG. 1, for example, service provider financial institution subsystem 350 may be configured to generate, include, or otherwise have access to at least one financial key or financial key set that may include a service provider private key ("SP-SK") 355a and a service provider public key ("SP-PK") 355b (e.g., a first financial key set of SP-SK 355a-1 and SP-PK 355b-1, and a second financial key set of SP-SK 355a-2 and SP-PK 355b-2). Each financial key set may be generated or accessed by service provider financial institution subsystem 350 from a particular payment network subsystem 360 of financial institution subsystem 350 (e.g., first financial key set of SP-SK 355a-1 and SP-PK 355b-1 may be associated with a first payment network subsystem 360 that may be operated by MasterCard and second financial key set of SP-SK 355a-2 and SP-PK 355b-2 may be associated with a second payment network subsystem 360 that may be operated by Visa). Any suitable algorithm may be used to generate each SP-SK 355a/SP-PK 355b financial key set, such as any suitable elliptic curve key generation ("ECKG") algorithm or scheme and/or any suitable elliptic curve key agreement ("ECKA") algorithm or scheme, such as those described in Section 4 of "BSI Technical Guideline TR-03111: Elliptic Curve Cryptography," which is hereby incorporated by reference herein in its entirety, and/or any suitable Rivest-Shamir-Adleman ("RSA") scheme.

As mentioned, a create BLOB request 558 received at step 508 may include any suitable data that may be indicative of a particular payment network subsystem 360 (e.g., Visa or MasterCard) of financial institution subsystem 350 that is to provision a commerce credential (e.g., applet data 153d) in the SSD 154 that is to receive the BLOB to be created based on create BLOB request 558. Therefore, in response to receiving a create BLOB request 558 requesting that a BLOB be created for an SSD that is to have a MasterCard credential provisioned thereon, secure element vendor subsystem 450 may access public key SP-PK 355b-1 of the first financial key set associated with MasterCard as at least a portion of financial public key data 559 at step 509. In some embodiments, secure element vendor subsystem 450 may access such financial public key data 559 directly from financial institution subsystem 350 in any suitable manner. Alternatively or additionally, secure element vendor subsystem 450 may access such financial public key data 559 from financial institution subsystem 350 via commercial entity subsystem 400 via any suitable communications path 75 of FIG. 1 using any suitable communications protocol. In some embodiments, such financial public key data 559 may be included as at least a portion of create BLOB request 558 provided to secure element vendor subsystem 450 from commercial entity subsystem 400. Additionally or alternatively, service provider financial institution subsystem 350 may be configured to sign a SP public key 355b with at least a portion of the CASP data 555 that may be received at step 505 by service provider financial institution subsystem 350 such that a signed SP public key 355b may be accessed by secure element vendor subsystem 450 as at least a portion of financial public key data 559. In any event, at least one appropriate public key SP-PK 355b associated with at least one appropriate payment network subsystem 360 or other suitable entity may be accessed by secure element vendor subsystem 450 in response to receiving a create BLOB request 558 at step 508 that may be instructive for creating a BLOB for an SSD that is to have provisioned thereon a credential that may be associated with that particular payment network subsystem 360. Additionally, commercial entity subsystem 400 may receive the public key SP-PK 355b and may create a certificate based on that public key SP-PK 355b (e.g., to create a signed public key that may become a certificate), and such a certificate may then be sent to financial institution subsystem 350 for sharing with secure element vendor subsystem 450 and/or such a certificate may be shared with secure element vendor subsystem 450 directly by commercial entity subsystem 400. This may enable any financial public key data 559 to be used by secure element vendor subsystem 450 to be certified by commercial entity subsystem 400.

Once a public key SP-PK 355b associated with a particular payment network subsystem 360 has been accessed by secure element vendor subsystem 450 as at least a portion of financial public key data 559 at step 509 in response to receiving a create BLOB request 558 at step 508 that may be instructive for creating a BLOB for an SSD that is to have provisioned thereon a credential that may be associated with that particular payment network subsystem 360, secure element vendor subsystem 450 may be configured to at least initiate the creation of such a BLOB. For example, at step 510, secure element vendor subsystem 450 may generate and/or transmit BLOB creation data 560 to secure element 145 and, at step 512, secure element 145 may receive and/or utilize such BLOB creation data 560 for generating and/or storing BLOB data as a BLOB 155b in an SSD key module 155 of an SSD 154 on secure element 145. In some embodiments, BLOB creation data 560 may include all of the data that may be stored on secure element 145 as a BLOB 155b. Alternatively or additionally, BLOB creation data 560 may include data that may be utilized by secure element 145 for generating at least a portion of BLOB 155b on secure element 145.

For example, BLOB creation data 560 may include financial public key data 559 (e.g., an SP-PK 355b) as well as instruction(s) for secure element 145 to create (e.g., at step 512) at least one SSD key (e.g., SSD key 155a) and then to encrypt (e.g., at step 512) such an SSD key with the financial public key data 559 of BLOB creation data 560 so as to create BLOB data 155b in an SSD key module 155 of an SSD 154, where such financial public key data 559 (e.g., SP-PK 355b) and/or such at least one SSD key (e.g., SSD key 155a) may or may not be stored or otherwise retained by secure element 145 along with BLOB data 155b (e.g., in the SSD key module 155, also at step 512). In some embodiments, blob creation data 560 may include data created using a public certificate from financial institution subsystem 350 (e.g., financial public key data 559 as may be signed by commercial entity subsystem 400) and one or more randomly generated keys (e.g., generated at commercial entity subsystem 400 and/or at secure element vendor subsystem 450). Additionally or alternatively, blob creation data 560 may include a copy of a public certificate from financial institution subsystem 350 (e.g., financial public key data 559 as may be signed by commercial entity subsystem 400) and/or a financial public key (e.g., a public key SP-PK 355) for independent storage on secure element 145 (e.g., for later BLOB generation on secure element 145).

As another example, BLOB creation data 560 may include financial public key data 559 (e.g., an SP-PK 355b)

and at least one SSD key (e.g., SSD key 155a), as well as instruction(s) for secure element 145 to encrypt (e.g., at step 512) such an SSD key of BLOB creation data 560 with the financial public key data 559 of BLOB creation data 560 so as to create BLOB data 155b in an SSD key module 155 of an SSD 154, where such financial public key data 559 (e.g., SP-PK 355b) and at least one SSD key (e.g., SSD key 155a) may or may not be stored or otherwise retained by secure element 145 along with BLOB data 155b (e.g., in the SSD key module 155, also at step 512).

As yet another example, BLOB creation data 560 may include at least one SSD key (e.g., SSD key 155a) encrypted with financial public key data 559 (e.g., an SP-PK 355b), as well as instruction(s) for secure element 145 to store such encrypted SSD key data of BLOB creation data 560 as BLOB data 155b in an SSD key module 155 of an SSD 154, where such financial public key data 559 (e.g., SP-PK 355b) and at least one SSD key (e.g., SSD key 155a) may or may not be independently included in BLOB creation data 560, and where such independent financial public key data and/or such independent SSD key data of BLOB creation data 560 may or may not be stored or otherwise retained by secure element 145 along with BLOB data 155b (e.g., in the SSD key module 155, also at step 512).

As shown in FIG. 4, each SSD key module 155 may include not only a BLOB 155b but also at least one SSD key 155a and at least one financial public key 355b associated with that BLOB 155b (e.g., one, some, or all of BLOB 155b, SSD key 155a, and financial public key 355b may be stored in the same data structure of an SSD key module 155 of an SSD 154), although an SSD key module 155 may only include BLOB 155b in certain embodiments.

As just one example, a first create BLOB request 558 may request that a first BLOB be generated and stored on secure element 145 in a first SSD 154-1, where such a first BLOB may be associated with a first service provider (e.g., a first payment network subsystem 360, such as MasterCard). In response to or concurrently with receiving such a first create BLOB request 558 at step 508, secure element vendor subsystem 450 may access a first SP-PK 355b-1 from financial institution subsystem 350 as at least a portion of first financial public key data 559 at step 509, where such a first SP-PK 355b-1 may be associated with the first service provider (e.g., a first payment network subsystem 360, such as MasterCard). Then, at step 510, secure element vendor subsystem 450 may generate and transmit any suitable first BLOB creation data 560 to secure element 145, where such first BLOB creation data 560 may enable or otherwise instruct secure element 145 to generate and/or store a first BLOB 155b-1 in an SSD key module 155-1 of a first SSD 154-1 at step 512. Such a first BLOB 155b-1 may include at least one first SSD key 155a-1 that may be encrypted with first SP-PK 355b-1, where one, both, or none of first SSD key 155a-1 and first SP-PK 355b-1 may be stored independently from first BLOB 155b-1 on secure element 145 (e.g., in SSD key module 155-1 of first SSD 154-1, also at step 512). A first applet module 153-1 of first SSD 154-1 may also be generated and stored at step 512, although no first applet data 153d-1 may yet be stored in that first applet module 153-1.

Additionally or alternatively, a second create BLOB request 558 may request that a second BLOB be generated and stored on secure element 145 in a second SSD 154-2, where such a second BLOB may be associated with a second service provider (e.g., a second payment network subsystem 360, such as Visa). In response to or concurrently with receiving such a second create BLOB request 558 at step 508, secure element vendor subsystem 450 may access a second SP-PK 355b-2 from financial institution subsystem 350 as at least a portion of second financial public key data 559 at step 509, where such a second SP-PK 355b-2 may be associated with the second service provider (e.g., a second payment network subsystem 360, such as Visa). Then, at step 510, secure element vendor subsystem 450 may generate and transmit any suitable second BLOB creation data 560 to secure element 145 that may enable or otherwise instruct secure element 145 to generate and/or store a second BLOB 155b-2 in an SSD key module 155-2 of a second SSD 154-2 at step 512. Such a second BLOB 155b-2 may include at least one second SSD key 155a-2 that may be encrypted with second SP-PK 355b-2, where one, both, or none of second SSD key 155a-2 and second SP-PK 355b-2 may be stored independently from second BLOB 155b-2 on secure element 145 (e.g., in SSD key module 155-2 of second SSD 154-2, also at step 512). A second applet module 153-2 of second SSD 154-2 may also be generated and stored at step 512, although no second applet data 153d-2 may yet be stored in that second applet module 153-2. In such embodiments, such a second create BLOB request 558 may be received by secure element vendor subsystem 450 after or concurrently with such a first create BLOB request 558, and/or secure element vendor subsystem 450 may generate and transmit such a second BLOB creation data 560 to secure element 145 after or concurrently with such a first BLOB creation data 560, and/or secure element 145 may generate and/or store such a second BLOB 155b-2 in a second SSD key module 155-2 of a second SSD 154-2 after or concurrently with such a first BLOB 155b-1 in a first SSD key module 155-1 of a first SSD 154-1.

SSD key(s) 155a and/or SP financial key sets (e.g., SP-SK 355a and SP-PK 355b) of any suitable type may be generated in any suitable way. In some embodiments, a Rivest-Shamir-Adleman ("RSA") Pull Model may be leveraged by financial institution subsystem 350 for generation of an SP financial key set and/or by secure element 145 for onboard key generation of SSD key(s) 155a and/or by secure element vendor subsystem 450 for generation of SSD key(s) 155a in a substantially similar fashion to that described with respect to key generation for supplemental security domains in "GlobalPlatform Card, Confidential Card Content Management, Card Specification, Version 2.2, Amendment A, Version 1.0.1, January 2011," which is hereby incorporated by reference herein in its entirety.

Alternatively, an Elliptic Curve Cryptography ("ECC") Pull Model may be leveraged by secure element 145 and/or by secure element vendor subsystem 450 and/or by financial institution subsystem 350 for generation of SSD key(s) 155a and/or an SP financial key set in a substantially similar fashion to that described with respect to key generation for supplemental security domains in U.S. Provisional Patent Application No. 61/932,526, filed on Jan. 28, 2014 and titled "SECURE PROVISIONING OF CREDENTIALS ON AN ELECTRONIC DEVICE USING ELLIPTIC CURVE CRYPTOGRAPHY," which is hereby incorporated by reference herein in its entirety.

Once a BLOB 155b has been stored on secure element 145, the secure element 145 may be provisioned on electronic device 100 and provided to an end user (e.g., for provisioning a credential on secure element 145). For example, at step 514, process 500 may include system 1 receiving a request to provision a commerce credential on secure element 145 of electronic device 100, where step 514 may include commercial entity subsystem 400 or any other suitable entity receiving any suitable request for a particular commerce credential to be provisioned on device 100 (e.g., a request initiated by a user of device 100 via interaction with an application of device 100 (e.g., through user interaction with GUI 180 on I/O interface 114a of device 100, such as during use of a setup assistant application associated with "Setup Assistant" icon 183 and/or during use of a "Passbook" or "Wallet" application associated with "Passbook" icon 184 of FIG. 3), a request initiated by commercial entity subsystem 400 itself, and/or a request generated by financial institution subsystem 350). Such a request of credential provisioning may include any suitable identification information associated with the selected credential that may be used by commercial entity subsystem 400 and/or financial institution subsystem 350 for provisioning that credential onto device 100 (e.g., a hashed or true listing of at least a portion of a primary account number ("PAN") for the selected credential, the card verification value ("CVV") for the selected credential, the expiration date for the selected credential, the billing address for the selected credential, the service provider (e.g., bank or payment network responsible for the credential), etc.). Moreover, such a request may include any other suitable information that may be useful for enabling the provisioning of the selected credential on device 100 (e.g., information associated with the target device 100, such as an SSD identifier, which may be indicative of an available SSD 154 of NFC component 120 of device 100 that may be able to receive such a provisioned credential).

In order to properly provision a commerce credential in a particular SSD 154 of secure element 145 in response to a provision card request of step 514, for example, process 500 may share certain BLOB data 155b of that particular SSD 154 of secure element 145 of electronic device 100 with the service provider of that commerce credential (e.g., financial institution subsystem 350). In some embodiments, when a provision card request of step 514 may be initiated by commercial entity subsystem 400 itself and/or by financial institution subsystem 350 and/or any other suitable entity other than electronic device 100, a BLOB data request 566 may be generated and/or transmitted to electronic device 100 at step 516 (e.g., from commercial entity subsystem 400 or any other suitable entity aware of the provision card request of step 514, such as financial institution subsystem 350). Such a BLOB data request 566 may include any suitable information that may be indicative of the provision card request of step 514. For example, BLOB data request 566 may include any suitable information indicative of the service provider responsible for the credential to be provisioned (e.g., a particular payment network 360 or any other suitable entity of financial institution subsystem 350). In response to receiving such a BLOB data request 566, electronic device 100 may identify the appropriate BLOB 155b on secure element 145 indicated by BLOB data request 566 and transmit that identified BLOB 155b to commercial entity subsystem 400 as BLOB data response 568 at step 518. For example, if the provision card request of step 514 is indicative of a request to provision a credential that is managed by a first service provider (e.g., a first payment network subsystem 360, such as MasterCard), BLOB data request 566 may include any suitable data indicative of that first service provider, and electronic device 100 may receive and analyze that BLOB data request 566 to identify a particular BLOB 155b of a particular SSD 154 on secure element 145 that may be associated with that first service provider (e.g., first BLOB 155b-1 of first SSD 154-1 that may include first SSD key 155a-1 encrypted with first financial public key SP-PK 355b-1 of that first service provider (e.g., a first payment network subsystem 360, such as MasterCard)). In response to identifying particular first BLOB 155b-1 of first SSD 154-1 in response to BLOB data request 566, electronic device 100 may transmit or otherwise share first BLOB 155b-1 with commercial entity subsystem 400 as BLOB data response 568 at step 518, where such BLOB data response 568 may first be encrypted with ISD key 156 by ISD 152 of secure element 145 of device 100, such that the encrypted BLOB data response 568 may not be accessible by any entity that is not privy to ISD key 156 (e.g., any entity other than ISD 152 and commercial entity subsystem 400). In such embodiments, BLOB data response 568 may be provided by electronic device 100 to commercial entity subsystem 400 via communications path 65 of FIG. 1. For example, as shown in FIGS. 1 and 4, communications component 106 of electronic device 100 may be configured to transmit such an encrypted BLOB data response 568 to commercial entity subsystem 400 using any suitable communications protocol over any suitable communications path 65, where encrypted BLOB data response 568 may be provided to commercial entity subsystem 400 and then may be decrypted by commercial entity subsystem 400 with ISD key 156 of commercial entity subsystem 400. As another example, if the provision card request of step 514 is indicative of a request to provision a credential that is managed by a second service provider (e.g., a second payment network subsystem 360, such as Visa), BLOB data request 566 may include any suitable data indicative of that second service provider, and electronic device 100 may receive and analyze that BLOB data request 566 to identify a particular BLOB 155b of a particular SSD 154 on secure element 145 that may be associated with that second service provider (e.g., second BLOB 155b-2 of second SSD 154-2 that may include second SSD key 155a-2 encrypted with second financial public key SP-PK 355b-2 of that second service provider (e.g., a second payment network subsystem 360, such as Visa)). In response to identifying particular second BLOB 155b-2 of second SSD 154-2 in response to BLOB data request 566, electronic device 100 may transmit or otherwise share second BLOB 155b-2 with commercial entity subsystem 400 as BLOB data response 568 at step 518, where such BLOB data response 568 may first be encrypted with ISD key 156 by ISD 152 of secure element 145 of device 100, such that the encrypted BLOB data response 568 may not be accessible by any entity that is not privy to ISD key 156 (e.g., any entity other than ISD 152 and commercial entity subsystem 400) and then may be decrypted by commercial entity subsystem 400 with ISD key 156 of commercial entity subsystem 400.

In other embodiments, when a provision card request of step 514 may be initiated by electronic device 100, a BLOB data request 566 may not be necessary and electronic device 100 itself may be configured to identify the appropriate BLOB 155b on secure element 145 associated with the credential to be provisioned. For example, if the provision card request of step 514 by electronic device 100 is indicative of a request to provision a credential that is managed by a first service provider (e.g., a first payment network subsystem 360, such as MasterCard), electronic device 100 may identify a particular BLOB 155b of a particular SSD 154 on secure element 145 that may be associated with that first service provider (e.g., first BLOB 155b-1 of first SSD 154-1 that may include first SSD key 155a-1 encrypted with first financial public key SP-PK 355b-1 of that first service provider (e.g., a first payment network subsystem 360, such as MasterCard)), and electronic device 100 may transmit or otherwise share identified first BLOB 155b-1 with commercial entity subsystem 400 as BLOB data response 568 at step 518, where such BLOB data response 568 may first be encrypted with ISD key 156 by ISD 152 of secure element 145 of device 100, such that the encrypted BLOB data response 568 may not be accessible by any entity that is not privy to ISD key 156 (e.g., any entity other than ISD 152 and commercial entity subsystem 400). In such embodiments, BLOB data response 568 may be provided by electronic device 100 to commercial entity subsystem 400 via communications path 65 of FIG. 1. For example, as shown in FIGS. 1 and 4, communications component 106 of electronic device 100 may be configured to transmit such an encrypted BLOB data response 568 to commercial entity subsystem 400 using any suitable communications protocol over any suitable communications path 65, where encrypted BLOB data response 568 may be provided to commercial entity subsystem 400 and then may be decrypted by commercial entity subsystem 400 with ISD key 156 of commercial entity subsystem 400. As another example, if the provision card request of step 514 by electronic device 100 is indicative of a request to provision a credential that is managed by a second service provider (e.g., a second payment network subsystem 360, such as Visa), electronic device 100 may identify a particular BLOB 155b of a particular SSD 154 on secure element 145 that may be associated with that second service provider (e.g., second BLOB 155b-2 of second SSD 154-2 that may include second SSD key 155a-2 encrypted with second financial public key SP-PK 355b-2 of that second service provider (e.g., a second payment network subsystem 360, such as Visa)), and electronic device 100 may transmit or otherwise share identified second BLOB 155b-2 with commercial entity subsystem 400 as BLOB data response 568 at step 518, where such BLOB data response 568 may first be encrypted with ISD key 156 by ISD 152 of secure element 145 of device 100, such that the encrypted BLOB data response 568 may not be accessible by any entity that is not privy to ISD key 156 (e.g., any entity other than ISD 152 and commercial entity subsystem 400) and then may be decrypted by commercial entity subsystem 400 with ISD key 156 of commercial entity subsystem 400. In such embodiments, when a provision card request of step 514 may be initiated by electronic device 100 and a BLOB data response 568 may be transmitted by electronic device 100 to commercial entity subsystem 400 at step 518 without first receiving a BLOB data request 566 at step 516, such a BLOB data response 568 of step 518 may be included as at least a portion of the provision card request of step 514 (e.g., such that only step 514 may occur and such that steps 516 and 518 are unnecessary). For example, such a provision card request may include a particular BLOB 155b from a particular SSD 154 of secure element 145 on which the requested card is to be provisioned.

Next, once an appropriate BLOB 155b of an available SSD 154 of secure element 145 of electronic device 100 has been provided by electronic device 100 to commercial entity subsystem 400 for a particular provision card request of step 514 (e.g., either at step 514 or as at least a portion of a BLOB data response 568 at step 518), commercial entity subsystem 400 (e.g., an SMP broker component of commercial entity subsystem 400) may be configured to send a request to financial institution subsystem 350 for the provisioning on device 100 of the credential requested at step 514 (e.g., using any suitable communications protocol over any suitable communications path 55 (e.g., via a TSM of path 55)). For example, at step 520 of process 500 of FIG. 5, commercial entity subsystem 400 may be configured to generate and transmit credential provisioning data 570 to an appropriate financial institution subsystem 350 (e.g., to an appropriate payment network subsystem 360) of financial institution subsystem 350) that may be identified at step 514 as the service provider or manager of the commerce credential to be provisioned. Such credential provisioning data 570 may include any suitable data or combination of data that may be utilized by service provider financial institution subsystem 350 to initiate the provisioning of a requested commerce credential onto secure element 145, such as data indicative of the selected credential that may be identified by the request at step 514 and/or data indicative of an SSD 154 of device 100 available for receiving the provisioned credential, such as the specific BLOB 155b data provided by electronic device 100 to commercial entity subsystem 400 (e.g., at step 518), where such BLOB 155b data may first be decrypted with ISD key 156 by commercial entity subsystem 400. Alternatively or additionally, credential provisioning data 570 may include any suitable data indicative of CASD 158 provisioned on secure element 145. For example, credential provisioning data 570 may include any suitable CASD data of CASD Data 554 that may have been accessible by commercial entity subsystem 400 at step 504 (e.g., CASD-Cert. 158c). By sharing certain CASD data with service provider financial institution subsystem 350, commercial entity subsystem 400 may enable service provider financial institution subsystem 350 to appropriately sign certain data to be shared with secure element 145 that may be later unsigned by CASD 158 of secure element 145. Credential provisioning data 570, which may include an appropriate BLOB 155b, may be provided by commercial entity subsystem 400 to financial institution subsystem 350 via communications path 55 of FIG. 1. For example, as shown in FIGS. 1 and 4, commercial entity subsystem 400 may be configured to transmit such credential provisioning data 570 to financial institution subsystem 350 using any suitable communications protocol over any suitable communications path 55.

As shown in FIG. 1, for example, service provider financial institution subsystem 350 may be configured to generate, include, or otherwise have access to at least one service provider private key ("SP-SK") 355a-1 and/or SP-SK 355a-2 and at least one a service provider public key ("SP-PK") 355b-1 and/or SP-PK 355b-2, where such keys may be generated or accessed by service provider financial institution subsystem 350. Therefore, when a particular BLOB 155b from secure element 145 is received at financial institution subsystem 350 as at least a portion of credential provisioning data 570, where such a BLOB 155b is encrypted with a particular SP-PK 355b, financial institution subsystem 350 may be configured to decrypt BLOB 155b with the associated SP-SK 355a of that SP-PK 355b in order to access the encrypted SSD key 155a of BLOB 155b at step 521. For example, if credential provisioning data 570 includes first BLOB 155b-1 of first SSD 154-1 of secure element 145, where first BLOB 155b-1 may include first SSD key 155a-1 encrypted with first SP-PK 355b-1, financial institution subsystem 350 may be configured to decrypt first BLOB 155b-1 with the associated first SP-SK 355a-1 in order to access the encrypted first SSD key 155a-1 of first BLOB 155b-1 of such credential provisioning data 570 at step 521. As another example, if credential provisioning data 570 includes second BLOB 155b-2 of second SSD 154-2 of secure element 145, where second BLOB 155b-2 may include second SSD key 155a-2 encrypted with second SP-PK 355b-2, financial institution subsystem 350 may be configured to decrypt second BLOB 155b-2 with the associated second SP-SK 355*a*-2 in order to access the encrypted second SSD key 155*a*-2 of second BLOB 155*b*-2 of such credential provisioning data 570 at step 521. Once financial institution subsystem 350 has decrypted a BLOB 155*b* of received credential provisioning data 570 for accessing at least one SSD key 155*a* of that BLOB 155*b*, financial institution subsystem 350 may leverage that SSD key 155*a* at step 521 to create a secure channel for commerce credential data (e.g., as requested at steps 514/520) between service provider financial institution subsystem 350 and SSD 154 (e.g., to communicate at least a portion of the commerce credential being provisioned) at step 522. For example, service provider financial institution subsystem 350 may leverage SSD key 155*a* accessed from credential provisioning data 570 at step 521 to encode, encrypt, wrap, sign, or otherwise transform some or all commerce credential data that is to be provisioned on an SSD 154 associated with that SSD key 155*a* as credential store data 572 and securely transmit such data 572 to electronic device 100 at step 522. Moreover, service provider financial institution subsystem 350 may sign such secure data 572 with CA information using ECDSA or any other suitable technique.

Such secure provisioning of credential store data 572 may include any suitable data, such as, a descriptor of the selected credential to be provisioned, as well as visual artwork and other metadata that may be provided on device 100 for aiding user interaction with the credential once provisioned (e.g., some or all suitable data that may enable device 100 to make the credential visually appear as available to device 100, such as visual logos/icons and other user discernible data associated with the credential that may be provided to the user (e.g., when the specific icon 182 labeled with a "Passbook" textual indicator 181 (i.e., specific icon 184) of FIG. 3 is selected, device 100 may launch or otherwise access a specific passbook or wallet application and may display screens of a specific user interface that may include one or more visual descriptors of the credential)), where such data 572 generated and encrypted by service provider financial institution subsystem 350 may be transmitted by financial institution subsystem 350 (e.g., by an appropriate payment network subsystem 360) to commercial entity subsystem 400 (e.g., to an SMP broker of commercial entity subsystem 400) via communications path 55 of FIG. 1 using any suitable communications protocol over any suitable communications path type (e.g., via a TSM of communications path 55) and that data 572 may be forwarded on by commercial entity subsystem 400 to device 100. Alternatively, encrypted data 572 may be forwarded directly from service provider financial institution subsystem 350 to device 100 via any suitable communications path 95 of FIG. 1 using any suitable communications protocol over any suitable communications path type.

As mentioned, such a credential store data 572 may be communicated to device 100 via commercial entity subsystem 400, where such a credential store data command 572 may be encrypted with issuer ISD key(s) 156 by commercial entity subsystem 400, such that the ISD-encrypted credential store data 572 may not be accessible by any entity that is not privy to issuer ISD key(s) 156 (e.g., any entity other than ISD 152 and commercial entity subsystem 400). In such embodiments, credential store data 572 may be provided by commercial entity subsystem 400 to electronic device 100 via communications path 65 of FIG. 1. For example, as shown in FIGS. 1 and 4, communications component 106 of electronic device 100 may be configured to receive such an ISD-encrypted credential store data 572 from commercial entity subsystem 400 using any suitable communications protocol over any suitable communications path 65, where ISD-encrypted credential store data 572 may be provided to device 100 and then decrypted with issuer ISD key(s) 156 of ISD 152 before being passed on to other portions of secure element 145, such as an appropriate SSD 154 for additional decrypting of the credential store data 572 with an SSD key 155*a* (e.g., an SSD key 155*a* that is the same as or associated with the SSD key 155*a* that may have been accessed by financial institution subsystem 350 at step 521 for encrypting credential store data 572).

In some embodiments, system 1 and/or process 500 may be configured to provision a virtual credential on device 100 rather than the actual credential that may be identified at step 514. For example, once it is determined that a credential is to be provisioned on device 100, it may be requested (e.g., by financial institution subsystem 350, by commercial entity subsystem 400, and/or by a user of device 100) that a virtual credential be generated, linked to the actual credential, and provisioned on device 100 instead of the actual credential. That is, commercial entity subsystem 400 may generate and transmit credential provisioning data 570 to financial institution subsystem 350 at step 520 that may also include a specific instruction for financial institution subsystem 350 to create a new virtual credential (e.g., a device primary account number ("D-PAN")), link that virtual credential with the selected actual credential (i.e., a funding primary account number ("F-PAN") originally issued by the issuing bank), and then provision that virtual credential onto device 100. Accordingly, in such embodiments, financial institution subsystem 350 may generate and transmit credential store data 572 at step 522 that may include a descriptor of the virtual credential (e.g., the D-PAN) to be provisioned and any suitable metadata that ought to be provided on device 100 for aiding user interaction with the virtual credential to be provisioned. Such linking or other suitable association of a virtual credential with an actual credential may be performed by any suitable component of financial institution subsystem 350. For example, financial institution subsystem 350 (e.g., a particular payment network subsystem 360 that may be associated with the brand of the actual credential identified at step 514) may define and store an entry in a virtual-linking table or data structure 352 (e.g., as shown in FIG. 1), where such an entry may create an association or link between the actual credential and a virtual credential. Thus, when a virtual credential is utilized by device 100 for a financial transaction with merchant subsystem 200 (e.g., after the virtual credential has been provisioned on device 100), financial institution subsystem 350 may receive an authorization request indicative of that virtual credential and may conduct an analysis of that authorization request in light of the actual credential associated or otherwise linked with the identified virtual credential as determined by virtual-linking table 352. By provisioning a virtual credential on device 100 rather than an actual credential, financial institution subsystem 350 may be configured to limit the fraudulent activity that may result if the virtual credential is intercepted by an unauthorized user (e.g., by an NFC communication 15 signal stealer positioned adjacent device 100 and/or merchant terminal 220), as financial institution subsystem 350 (e.g., payment network subsystem 360) may only be configured to utilize virtual-linking table 352 for linking the virtual credential to the actual credential during certain transactions (e.g., during NFC transactions received by merchant terminal 220 and not during online transactions or other transactions that may allow credential information to be manually entered by a user). Therefore, in such embodiments using a virtual credential, credential store data 572 generated and encrypted by financial institution subsystem 350 may contain a new D-PAN (e.g., new virtual credential information) from an entry in table 352 that may define a link between an F-PAN (e.g., an actual credential banking number) of the selected credential and this new D-PAN. Credential store data 572 may also include the last four digits or any other suitable data of the linked F-PAN for creating a hashed version of the F-PAN. Providing both the virtual D-PAN and a hashed version of the actual F-PAN on device 100 may prevent user confusion between the two and may enable easier user association of the two when utilizing a virtual credential for a financial transaction. Therefore, in some embodiments, a full version of an F-PAN (e.g., an actual credential banking number) may never be stored on device 100, but rather only an associated D-PAN (e.g., a linked virtual credential) may be stored in non-hashed form on device 100. Credential store data 572 may also include a unique D-PAN hash (e.g., the last four digits of the D-PAN and/or any other suitable data for creating a hashed version of the D-PAN that may be used in all subsequent calls to reference this D-PAN while maintaining security of the D-PAN).

Credential store data 572 may also include an "AuthToken" or any other suitable token that may be a one-time use token for enabling provision of the credential. Additionally or alternatively, credential store data 572 may include put pending command data that may include the primary account number (e.g., D-PAN or F-PAN, hashed or not) of the credential being provisioned, one or more persoScripts or GlobalPlatform application protocol data unit ("APDU") scripts (e.g., any scripts, any rotate keys (e.g., if necessary), and any other suitable administrative elements that may be used to provision a usable PAN on device 100), an SSD identifier, and/or an SSD counter.

Then, in response to receiving such securely encrypted and/or signed credential store data 572 transmitted at step 522 (e.g., encrypted with SSD key 155a by financial entity subsystem 350 and/or encrypted with issuer ISD key(s) 156 by commercial entity subsystem 400), device 100 (e.g., ISD 152 and/or CASD 158 and/or SSD 154) may appropriately unencrypt data 572 with ISD key(s) 156 of ISD 152 and/or with SSD key 155a of an appropriate SSD 154, and may securely load credential data 572 into the appropriate SSD 154 (e.g., into applet module 153 of the appropriate SSD 154 as applet data 153d) at step 524. If data 572 was signed by service provider financial entity subsystem 350, CASD 158 may confirm that data 572 was properly signed and then unsign such data 572 before providing it to SSD 154. Then, also at step 524, the appropriate SSD 154 (e.g., the SSD key module 155 of that SSD 154) may leverage its SSD key(s) 155a local to secure element 145 to decode, decrypt, unwrap, or otherwise untransform the credential data of data 572 that had been encoded, encrypted, wrapped, or otherwise transformed by service provider financial entity subsystem 350 (e.g., using SSD key 155a accessed from received credential provisioning data 570 at step 521). Then, also at step 524, secure element 145 (e.g., SSD key module 155) may load that decoded, decrypted, unwrapped, or otherwise untransformed credential data of data 572 into an appropriate portion of SSD 154 (e.g., into applet module 153 as applet data 153d). When data 572 is loaded into SSD 154 at step 524, device 100 may be configured to complete any of the received scripts from data 572 and/or take any other suitable action for enabling the credential (e.g., for toggling the credential from a disabled/pending activation state to an enabled/active for use state). Then, any suitable confirmation data 576 may be generated and transmitted by device 100 at step 526 for alerting commercial entity subsystem 400 and/or service provider financial entity subsystem 350 that the commerce credential has been successfully provisioned and/or enabled on secure element 145 (e.g., such that the provisioned commerce credential may be used in a commercial transaction as described herein with respect to subsystems 200 and 300 of FIG. 1).

For example, in response to receiving credential store data 572 that has been securely encrypted/transformed by financial institution subsystem 350 using first SSD key 155a-1, first SSD 154-1 may be configured or otherwise enabled to decrypt or otherwise untransform such credential store data 572 using first SSD key 155a-1 available to first SSD key module 155-1 of that first SSD 154-1 at step 524. Then, that first SSD 154-1 may load that decoded, decrypted, unwrapped, or otherwise untransformed credential data of data 572 into first applet module 153-1 of that first SSD 154-1 as first applet data 153d-1 at step 524. Alternatively or additionally, in response to receiving credential store data 572 that has been securely encrypted/transformed by financial institution subsystem 350 using second SSD key 155a-2, second SSD 154-2 may be configured or otherwise enabled to decrypt or otherwise untransform such credential store data 572 using second SSD key 155a-2 available to second SSD key module 155-2 of that second SSD 154-2 at step 524. Then, that second SSD 154-2 may load that decoded, decrypted, unwrapped, or otherwise untransformed credential data of data 572 into second applet module 153-2 of that second SSD 154-2 as second applet data 153d-2 at step 524. In some embodiments, an SSD key 155a of an SSD 154 may include a public SSD key and a private SSD key, where the associated BLOB 155b of that SSD 154 may be the public SSD key portion of the SSD key 155a as encrypted with the associated SP-PK 355b-1 of that SSD 154, and where the private SSD key portion of the SSD key 155a of that SSD 154 may be used to decrypt or otherwise untransform credential store data 572 at step 524. Therefore, public and private key portions of an SSD key 155a of an SSD 154 may be leveraged similarly to public and private key portions SP-SK 355a/SP-PK 355b of a financial key set.

Therefore, process 500 may provide for the efficient storing of credential service provider data (e.g., SP-PK 355b) in a security domain (e.g., SSD 154) of secure element 145 of electronic device 100. Such efficient storing of credential service provider data (e.g., BLOB 155b data at steps 508-512) may be achieved through the use of a secure element vendor subsystem 450 during the initialization of secure element 145 and/or through the use of commercial entity subsystem 400 before electronic device 100 including secure element 145 may be provided to an end user. This may reduce the amount of communications or communicated information that may otherwise be required of electronic device 100 with one or more remote entities (e.g., commercial entity subsystem 400 and/or financial institution subsystem 350) when a credential is being provisioned on secure element 145 by the end user (e.g., at steps 514-524). For example, if BLOB 155b data is not pre-stored on secure element 145 or is not able to be generated independently on secure element 145 before secure element 145 is in the field being used by an end user of electronic device 100 for provisioning a credential on secure element 145 (e.g., before step 514), then additional communications not shown by process 500 of FIG. 5 between secure element 145 and commercial entity subsystem 400 and/or financial institution subsystem 350 may be required to enable the above-described secure communication channel that may be used for transmitting SSD key 155a from secure element 145 to financial institution subsystem 350 at steps 518/520 of process 500 and/or to enable the above-described secure communication channel that may be used for transmitting credential store data 572 from financial institution subsystem 350 to secure element 145 at step 522 of process 500. Additionally or alternatively, this may reduce the amount of time that may otherwise be required by electronic device 100 to generate the necessary information to be shared with one or more remote entities (e.g., commercial entity subsystem 400 and/or financial institution subsystem 350) when a credential is being provisioned on secure element 145 by the end user (e.g., at steps 514-524). For example, if BLOB 155b data is not pre-stored on or otherwise accessible to secure element 145 before secure element 145 is in the field being used by an end user of electronic device 100 for provisioning a credential on secure element 145 (e.g., before step 514), then additional time may be required by a credential provisioning process than may be required by process 500 of FIG. 5 as a delay would be required after a provision card request in order to allow BLOB 155b data or similar data to be generated for use in the credential provisioning process. Thus, rather than creating a new SSD 154 on a secure element 145 every time a new credential is to be provisioned on secure element 145 (e.g., after step 514) when secure element 145 is "in the field" under the control of an end user, the creation and storage of credential service provider data (e.g., SP-PK 355b and/or BLOB 155b) in a new SSD 154 "in factory" (e.g., by secure element vendor subsystem 450 and/or commercial entity subsystem 400 prior to providing electronic device 100 with secure element 145 to an end user) may cut down on the time and/or the number of communications between electronic device 100 and a remote entity (e.g., commercial entity subsystem 400 and/or financial institution subsystem 350) that may be required to provision a new credential on secure element 145.

When an applet module 153 of an SSD 154 of secure element 145 is personalized with an applet instance (e.g., when applet data 153d is stored in that applet module 153 during the provisioning of a credential, such as at step 524), a new SSD 154 may be automatically generated (e.g., a new SSD 154 may be created with a new BLOB 155b and an empty applet module 153), such that this new SSD 154 may likewise increase the efficiency of the use of system 1. For example, when second applet module 153-2 of second SSD 154-2 is loaded with credential data 572 from a second credential service provider associated with second SP-PK 355b-2 (e.g., a Visa payment network 360, as mentioned above) at step 524, a new third SSD 154-3 may be automatically created on secure element 145 that may include third BLOB 155b-3 data that may be associated with the same credential service provider as was the most recently personalized SSD 154-2 (e.g., a second credential service provider associated with second SP-PK 355b-2 (e.g., a Visa payment network 360, as mentioned above)). In some embodiments, such automated generation of third SSD 154-3 may be initiated (e.g., automatically) by commercial entity subsystem 400 and/or financial institution subsystem 350 in response to receiving confirmation data 576 from electronic device 100 at step 526 indicative of the provisioning of credential data 572 in second SSD 154-2 and/or after/concurrently with transmitting credential store data 572 for second SSD 154-2 at step 522. For example, as shown in FIG. 5, in response to receipt of such confirmation data 576 for the personalization of second SSD 154-2 at step 526 or while/after transmitting credential store data 572 for second SSD 154-2 at step 522, commercial entity subsystem 400 and/or financial institution subsystem 350 (e.g., directly or via commercial entity subsystem 400) may generate and transmit a new BLOB request 578 to secure element 145 at step 528 of process 500. Such a new BLOB request 578 may include any suitable data that may be received by secure element 145 and that may enable secure element 145 to generate and/or store a BLOB 155b-3 in a SSD key module 155-3 of a new third SSD 154-3. In some such embodiments, commercial entity subsystem 400 and/or financial institution subsystem 350 may simply include an instruction in new BLOB request 578 of step 528 that may instruct secure element 145 to generate a new SSD 154 with a new BLOB 155b that is based on the SP-PK that is associated with the most recently personalized SSD 154 of secure element 145 (e.g., SP-PK 355b-2 of second SSD 154-2). In some other such embodiments, commercial entity subsystem 400 and/or financial institution subsystem 350 may leverage the known identity of the credential service provider that provisioned the last credential on secure element 145 (e.g., the second credential service provider associated with second SP-PK 355b-2 (e.g., a Visa payment network 360, as mentioned above)), and may include that second SP-PK 355b-2 as at least a portion of the new BLOB request 578 of step 528. Such a new BLOB request 578 may also include an instruction for causing secure element 145, at step 530, to generate a new third SSD 154-3 with a new BLOB 155b-3 that may include a third SSD key 155a-3 that may be encrypted or otherwise transformed by that second SP-PK 355b-2. Such a third SSD key 155a-3 and/or that second SP-PK 355b-2 may also be stored along with new BLOB 155b-3 in third SSD 154 as similarly described above with respect to SP-PK 355b-1 and SSD key 155a-1 of SSD 154-1. In some embodiments, system 1 may be configured such that financial institution subsystem 350 may only initiate the generation of a new SSD as part of a personalization request (e.g., give me an SSD for use), whereas the actual act of creating the SSD may be done by commercial entity subsystem 400. When one SSD gets used, a new one may be generated automatically or a new one may be generated after a request for a new SSD is received by financial institution subsystem 350 or device 100. Moreover, in some embodiments, if commercial entity subsystem 400 receives a BLOB that is associated with a financial public key that is no longer current (e.g., a financial public key that was once used but has since been deleted or disabled by financial institution subsystem 350 (e.g., due to a key set of that key being compromised after the BLOB was generated)), commercial entity subsystem 400 may identify that the public key is now obsolete (e.g., due to receiving update information from financial institution subsystem 350 about when a public key is obsolete), and commercial entity subsystem 400 may be configured to delete the associated SSD and automatically generate a new BLOB.

Rather than receiving a new BLOB request 578 from a remote entity (e.g., from commercial entity subsystem 400 and/or financial institution subsystem 350) at step 528 in order to generate and/or store new BLOB 155b-3 data in a new SSD 154-3, electronic device 100 may be configured to automatically generate and/or store new BLOB 155b-3 data in a new SSD 154-3 at step 530 without receiving a request to do so from a remote entity. For example, in response to receiving credential store data 572 for second SSD 154-2 at step 522 and/or in response to personalizing second SSD 154-2 at step 524 and/or in response to transmitting confirmation data 576 at step 526, electronic device 100 may be configured to automatically initiate the creation of a new SSD 154-3 at step 530 that may include a new BLOB 155*b*-3, where such a new BLOB 155*b*-3 may be on the SP-PK that may be associated with the most recently personalized SSD 154 of secure element 145 (e.g., SP-PK 355*b*-2 of second SSD 154-2). In any event, whether new BLOB data 155*b*-3 is generated and/or stored in a new SSD 154-3 of secure element 145 at step 530 in response to a new BLOB request 578 received from a remote entity or automatically by electronic device 100 itself, such new SSD 154-3 and its BLOB data 155*b*-3 may be used as described above with respect to SSD 154-1 and/or SSD 154-2 for more efficiently provisioning a new credential on secure element 145.

It is understood that the steps shown in process 500 of FIG. 5 are merely illustrative and that existing steps may be modified or omitted, additional steps may be added, and the order of certain steps may be altered. It is also to be understood that certain steps of process 500 (e.g., steps 508-512) may occur when at least a portion of secure element 145 is local to or otherwise under the control of secure element vendor subsystem 450 and/or is local to or otherwise under the control of commercial entity subsystem 400 (e.g., when secure element 145 is being provisioned into electronic device 100 during the manufacturing of device 100), and/or while other steps of process 500 (e.g., steps 514-530) may occur when secure element 145 is local to or otherwise under the control of an end user of electronic device 100 (e.g., when device 100 with secure element 145 is being used by an end user to provision a credential on secure element 145 and/or use such a provisioned credential during a commercial transaction).

Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145 may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card.

Description of FIG. 6

FIG. 6 is a flowchart of an illustrative process 600. At step 602, prior to an event, process 600 may store credential service provider data in a security domain of an electronic device. For example, as described above with respect to FIGS. 1-5, an SP-PK 355*b*-1 and/or BLOB 155*b*-1 may be stored in a first SSD 154-1 of electronic device 100 (e.g., at step 512 of process 500). Next, at step 604, after the event, process 600 may establish a secure communication channel between the security domain and a credential service provider using the stored credential service provider data. For example, as described above with respect to FIGS. 1-5, device 100 may be configured to establish a secure communication channel between SSD 154-1 and financial institution subsystem 350 using BLOB 155*b*-1 (e.g., at steps 518/520 of process 500). Moreover, the event of process 600 may include at least one of an end user achieving access to the electronic device and the generation of a request to provision a credential of the credential service provider on the security domain. For example, as described above with respect to FIGS. 1-5, SP-PK 355*b*-1 and/or BLOB 155*b*-1 may be stored in a first SSD 154-1 of electronic device 100 (e.g., at step 512 of process 500) prior to an end user of device 100 achieving access to device 100 and/or prior to the generation of a provision card request at step 514 of process 500. Moreover, as described above with respect to FIGS. 1-5, device 100 may be configured to establish a secure communication channel between SSD 154-1 and financial institution subsystem 350 using BLOB 155*b*-1 (e.g., at steps 518/520 of process 500) after an end user of device 100 achieving access to device 100 and/or after the generation of a provision card request at step 514 of process 500.

It is understood that the steps shown in process 600 of FIG. 6 are merely illustrative and that existing steps may be modified or omitted, additional steps may be added, and the order of certain steps may be altered.

Description of FIG. 7

FIG. 7 is a flowchart of an illustrative process 700. At step 702, process 700 may provision a credential of a credential service provider in a first security domain of a secure element of an electronic device. For example, as described above with respect to FIGS. 1-5, credential store data 572 of a financial institution subsystem 350 may be provisioned in SSD 154-2 of secure element 145 of electronic device 100 (e.g., at steps 522/524 of process 500). Next, at step 704, in response to the provisioning of step 702, process 700 may create a second security domain of the secure element. For example, as described above with respect to FIGS. 1-5, in response to the provisioning of a credential in SSD 154-2, a new SSD 154-3 may be created on secure element 145 (e.g., at steps 578/530 of process 500).

It is understood that the steps shown in process 700 of FIG. 7 are merely illustrative and that existing steps may be modified or omitted, additional steps may be added, and the order of certain steps may be altered.

Further Description of FIG. 1

As mentioned, merchant terminal 220 may be provided by any suitable merchant of merchant subsystem 200 that may provide a product or service to a user of device 100 in response to device 100 providing payment credentials via an NFC communication 15 (e.g., indicative of a provisioned credential of applet data 153*d* of an SSD 154) to terminal 220. Based on such a received NFC communication 15, merchant subsystem 200 may be configured to generate and transmit data 295 to acquiring bank subsystem 300 (e.g., via a communication path 25 between merchant subsystem 200 and acquiring bank subsystem 300), where data 295 may include payment information and an authorization request that may be indicative of the user's commerce credential and the merchant's purchase price for the product or service. Also known as a payment processor or acquirer, acquiring bank subsystem 300 may be a banking partner of the merchant associated with merchant subsystem 200, and acquiring bank subsystem 300 may be configured to work with financial institution subsystem 350 to approve and settle credential transactions attempted by electronic device 100 via NFC communication 15 with merchant subsystem 200. Acquiring bank subsystem 300 may then forward the authorization request from data 295 to financial institution subsystem 350 as data 395 (e.g., via a communication path 35 between acquiring bank subsystem 300 and financial institution subsystem 350). One, some, or all components of acquiring bank subsystem 300 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100.

As mentioned, payment network subsystem 360 and issuing bank subsystem 370 may be a single entity or separate entities. For example, American Express may be both a payment network subsystem 360 and an issuing bank subsystem 370. In contrast, Visa and MasterCard may be payment network subsystems 360, and may work in cooperation with issuing bank subsystems 370, such as Chase, Wells Fargo, Bank of America, and the like. In the case of payment network subsystem 360 and issuing bank subsystem 370 being separate entities, payment network subsystem 360 may receive the authorization request of data 395 from acquiring bank subsystem 300 and may then forward the request to issuing bank subsystem 370 as data 495 (e.g., via a communication path 45 between payment network subsystem 360 and issuing bank subsystem 370). In the case of payment network subsystem 360 and issuing bank subsystem 370 being the same entity, acquiring bank subsystem 300 may submit the authorization request of data 395 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. As mentioned, financial institution subsystem 350 may include at least two payment network subsystems 360 (only one payment network subsystem 360 may be shown in FIG. 1 for clarity), where each payment network subsystem 360 may work in cooperation with two or more issuing bank subsystems 370. Alternatively, system 1 may include two or more distinct financial institution subsystems 350 (only one financial institution subsystem 350 may be shown in FIG. 1 for clarity), where each financial institution subsystem 350 may include a particular payment network subsystem 360 and may also include at least one issuing bank subsystem 370 that may work in cooperation with that particular payment network subsystem 360. Alternatively or additionally, financial institution subsystem 350 may also include one or more acquiring banks, such as acquiring bank subsystem 300. For example, acquiring bank subsystem 300 may be the same entity as an issuing bank subsystem 370. One, some, or all components of payment network subsystem 360 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100.

When issuing bank subsystem 370 receives an authorization request (e.g., directly from acquiring bank subsystem 300 as data 395 or indirectly via payment network subsystem 360 as data 495), the payment information (e.g., commerce credential information of device 100) and the purchase amount included in the authorization request may be analyzed to determine if the account associated with the commerce credential has enough credit to cover the purchase amount. If sufficient funds are not present, issuing bank subsystem 370 may decline the requested transaction by transmitting a negative authorization response 499 to acquiring bank subsystem 300 (i.e., as response 399 via payment network subsystem 360). However, if sufficient funds are present, issuing bank subsystem 370 may approve the requested transaction by transmitting a positive authorization response 499/399 to acquiring bank subsystem 300 and the financial transaction may be completed, while notification of the authorization response may be forwarded on to merchant subsystem 200 from acquiring bank subsystem 300 as data 299. Either type of authorization response may be provided by user financial subsystem 350 to acquiring bank subsystem 300 as authorization response data 399 (e.g., authorization response data 399 may be provided directly from issuing bank subsystem 370 to acquiring bank subsystem 300 via communication path 35, or authorization response data 399 may be provided from payment network subsystem 360 to acquiring bank subsystem 300 based on authorization response data 499 that may be provided to payment network subsystem 360 from issuing bank subsystem 370 via communication path 45).

As mentioned, although not shown, commercial entity subsystem 400 of FIG. 1 may be a secure platform system and may include a secure mobile platform ("SMP") broker component, an SMP trusted services manager ("TSM") component, an SMP crypto services component, an identity management system ("IDMS") component, a fraud system component, a hardware security module ("HSM") component, and/or a store component. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience when it is being determined whether or not to provision a credential from financial institution subsystem 350 on to device 100.

An SMP broker component of commercial entity subsystem 400 may be configured to manage user authentication with a commercial entity user account. Such an SMP broker component may also be configured to manage the life cycle and provisioning of credentials on device 100. An SMP broker component may be a primary end point that may control the user interface elements (e.g., elements of GUI 180) on device 100. An operating system or other application of device 100 (e.g., application 103, application 113, and/or application 143) may be configured to call specific application programming interfaces ("APIs") and an SMP broker component may be configured to process requests of those APIs and respond with data that may derive the user interface of device 100 and/or respond with application protocol data units ("APDUs") that may communicate with secure element 145 of NFC component 120 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). An SMP TSM component of commercial entity subsystem 400 may be configured to provide GlobalPlatform-based services that may be used to carry out credential provisioning operations on device 100 from financial institution subsystem 350. GlobalPlatform, or any other suitable secure channel protocol, may enable such an SMP TSM component to properly communicate and/or provision sensitive account data between secure element 145 of device 100 and a TSM for secure data communication between commercial entity subsystem 400 and financial institution subsystem 350.

An SMP TSM component of commercial entity subsystem 400 may be configured to use an HSM component of commercial entity subsystem 400 to protect its keys and generate new keys. An SMP crypto services component of commercial entity subsystem 400 may be configured to provide key management and cryptography operations that may be required for user authentication and/or confidential data transmission between various components of system 1. Such an SMP crypto services component may utilize an HSM component of commercial entity subsystem 400 for secure key storage and/or opaque cryptographic operations. A payment crypto service of an SMP crypto services component of commercial entity subsystem 400 may be configured to interact with an IDMS component of commercial entity subsystem 400 to retrieve on-file credit cards or other types of commerce credentials associated with user accounts of the commercial entity. Such a payment crypto service may be configured to be the only component of commercial entity subsystem 400 that may have clear text (i.e., non-hashed) information describing commerce credentials (e.g., credit card numbers) of its user accounts in memory. A commercial entity fraud system component of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Such a commercial entity fraud system component of commercial entity subsystem 400 may be configured to determine a commercial entity fraud score for the credential based on various factors or thresholds. Additionally or alternatively, commercial entity subsystem 400 may include a store component, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.). As just one example, such a store component of commercial entity subsystem 400 may be configured to manage and provide an application 113 to device 100 (e.g., via communications path 65), where application 113 may be any suitable application, such as a banking application, an e-mail application, a text messaging application, an internet application, or any other suitable application. Any suitable communication protocol or combination of communication protocols may be used by commercial entity subsystem 400 to communicate data amongst the various components of commercial entity subsystem 400 and/or to communicate data between commercial entity subsystem 400 and other components of system 1 (e.g., financial institution subsystem 350 via communications path 55 of FIG. 1 and/or electronic device 100 via communications path 65 of FIG. 1).

Further Description of FIG. 2, FIG. 3, and FIG. 4

As mentioned, and as shown in FIG. 2, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semipermanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of fours, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, cryptography applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications 15 between electronic device 100 and merchant subsystem 200 (e.g., a merchant payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15593. Alternatively or additionally, NFC component 120 may allow for close range communication at relatively high data rates (e.g., 370 Mbps), and may comply with any suitable standards, such as the TransferJet™ protocol. Communication between NFC component 120 and merchant subsystem 200 may occur within any suitable close range distance between device 100 and merchant subsystem 200 (see, e.g., distance D of FIG. 1), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., terminal 220 of merchant subsystem 200).

NFC component 120 may include any suitable modules for enabling contactless proximity-based communication 15 between electronic device 100 and merchant subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to merchant subsystem 200 as part of a contactless proximity-based or NFC communication 15. Additionally or alternatively, NFC data module 132 may be configured to contain, route, or otherwise receive any suitable data that may be received by NFC component 120 from merchant subsystem 200 as part of a contactless proximity-based communication 15.

NFC transceiver or NFC antenna 134 may be any suitable antenna or other suitable transceiver circuitry that may generally enable communication of communication 15 from NFC data module 132 to merchant subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication 15 between NFC data module 132 of NFC device module 130 and another entity (e.g., merchant subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication 15 to subsystem 200. For example, shared antenna 116 may require amplification from booster 136 before antenna 116 (e.g., a non-loop antenna) may be properly enabled for communicating contactless proximity-based or NFC communication 15 between electronic device 100 and merchant subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating NFC communication 15 between electronic device 100 and merchant subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, wallet applications, cryptography applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., merchant subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 15) from NFC tags (e.g., from merchant subsystem 200) to NFC data module 132, a peer-to-peer mode for exchanging data (e.g., communication 15) with another NFC enabled device (e.g., merchant subsystem 200), and a card emulation mode for allowing another NFC enabled device (e.g., merchant subsystem 200) to read information (e.g., communication 15) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., merchant subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 113 and/or application 143).

NFC memory module 150 may operate in conjunction with NFC device module 130 and/or NFC controller module 140 to allow for NFC communication 15 between electronic device 100 and merchant subsystem 200. NFC memory module 150 may be embedded within NFC device hardware or within an NFC integrated circuit ("IC"). NFC memory module 150 may be tamper resistant and may provide at least a portion of secure element 145. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of secure element 145, which may be tamper resistant. For example, such a secure element 145 may be configured to provide a tamper-resistant platform (e.g., as a single- or multiple-chip secure microcontroller) that may be capable of securely hosting applications and their confidential and cryptographic data in accordance with rules and security requirements that may be set forth by a set of well-identified trusted authorities (e.g., an authority of financial institution subsystem and/or an industry standard, such as GlobalPlatform). Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145 may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card. NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems.

As shown in FIGS. 2 and 4, NFC memory module 150 may include one or more of an issuer security domain ("ISD") 152 and at least one supplemental security domain ("SSD") 154 (e.g., a service provider security domain ("SPSD"), a trusted service manager security domain ("TSMSD"), etc.), and CASD 158, one or more of which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") 154 may be associated with a particular TSM and at least one specific commerce credential (e.g., a specific credit card credential or a specific public transit card credential) that may provide specific privileges or payment rights to electronic device 100. For example, a first payment network subsystem 360 (e.g., MasterCard) may be the TSM or credential service provider for a first SSD 154-1 and at least one applet 153 of that first SSD 154-1 may be associated with a commerce credential managed by that first payment network subsystem 360, while a second payment network subsystem 360 (e.g., Visa) may be the TSM or credential service provider for a second SSD 154-2 and at least one applet 153 of that second SSD 154-2 may be associated with a commerce credential managed by that second payment network subsystem 360.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to merchant subsystem 200 as NFC communication 15. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of secure element 145). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

While NFC component 120 has been described with respect to near field communication, it is to be understood that component 120 may be configured to provide any suitable contactless proximity-based mobile payment or any other suitable type of contactless proximity-based communication 15 between electronic device 100 and merchant subsystem 200. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

As mentioned, and as shown in FIG. 3, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 3, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Setup Assistant" textual indicator 181 (i.e., specific icon 183) is selected, device 100 may launch or otherwise access a specific setup application and may display screens of a specific user interface that may include one or more tools or features for interacting with device 100 in a specific manner. For each application, screens may be displayed on display output component 112a and may include various user interface elements. Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a nimbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 3, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 3). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Moreover, one, some, or all of the processes described with respect to FIGS. 1-7 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, electronic device 100 may drive a display (e.g., display output component 112a) with graphical data to display a graphical user interface ("GUI") 180. GUI 180 may be configured to receive touch input via a touch input component 110f. Embodied as a touch screen (e.g., with display output component 112a as I/O component 114a), touch I/O component 110f may display GUI 180. Alternatively, GUI 180 may be displayed on a display (e.g., display output component 112a) separate from touch input component 110f. GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110f, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. In other embodiments, in which gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

Further Applications of Described Concepts

While there have been described systems, methods, and computer-readable media for efficiently storing credential service provider data in a security domain of a secure element of an electronic device, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:
1. A method comprising:
   prior to an event, storing credential service provider data from a credential service provider in a supplemental security domain of a secure element of an electronic device, wherein the credential service provider data comprises a credential service provider public key of a credential service provider public-private key set, the credential service provider public key used for encryption of a supplemental security domain key corresponding to the supplemental security domain; and
   after the event, establishing a secure communication channel between the supplemental security domain and the credential service provider using the stored credential service provider data, for use in provisioning a first credential of the credential service provider on the supplemental security domain, wherein the event comprises at least one of:
      an end user achieving access to the electronic device; or
      receipt of an end user request to provision the first credential of the credential service provider on the electronic device.

2. The method of claim 1, wherein the event comprises the end user achieving access to the electronic device.

3. The method of claim 1, wherein the event comprises the receipt of the end user request to provision the first credential of the credential service provider on the supplemental security domain.

4. The method of claim 1, wherein the storing the credential service provider data comprises a secure element vendor subsystem transmitting the credential service provider data to the secure element.

5. The method of claim 1, wherein the credential service provider public-private key set is generated by the credential service provider.

6. The method of claim 1, wherein the credential service provider data from the credential service provider comprises the supplemental security domain key encrypted with the credential service provider public key.

7. The method of claim 1, further comprising provisioning the first credential of the credential service provider on the supplemental security domain using the established secure communication channel.

8. The method of claim 7, further comprising, in response to the provisioning, creating an other supplemental security domain of the secure element on the electronic device.

9. The method of claim 8, wherein:
the creating the other supplemental security domain comprises storing other credential service provider data in the other supplemental security domain; and
the other credential service provider data is associated with the credential service provider.

10. The method of claim 8, wherein:
the creating the other supplemental security domain comprises storing the credential service provider data in the other supplemental security domain; and
the credential service provider data is associated with the credential service provider.

11. The method of claim 1, wherein the establishing the secure communication channel between the supplemental security domain and the credential service provider comprises transmitting a supplemental security domain key of the supplemental security domain, which is encrypted by the stored credential service provider data, from the supplemental security domain to the credential service provider.

12. The method of claim 11, wherein the supplemental security domain key of the supplemental security domain is generated prior to the event.

13. The method of claim 11, wherein the supplemental security domain key of the supplemental security domain is encrypted by the stored credential service provider data prior to the event.

14. The method of claim 11, wherein the supplemental security domain key comprises a security domain public key of a security domain public-private key set.

15. The method of claim 1, wherein the credential service provider public-private key set is generated by an elliptic curve algorithm or a Rivest-Shamir-Adleman scheme.

16. The method of claim 1, wherein the supplemental security domain does not include any provisioned credentials of the credential service provider prior to provisioning the first credential of the credential service provider.

17. A method comprising:
prior to an event, store credential service provider data of a credential service provider in a first supplemental security domain on a secure element of an electronic device, wherein the credential service provider data comprises a credential service provider public key of a credential service provider public-private key set;
after the event, establish a secure communication channel between the secure element and the credential service provider using the stored credential service provider data;
provisioning a credential of the credential service provider in the first supplemental security domain of the secure element of the electronic device using the secure communication channel; and
in response to a confirmation that the credential of the credential service provider has been provisioned in the first supplemental security domain of the secure element, automatically creating a second supplemental security domain of the secure element, the second supplemental security domain corresponding to the credential service provider.

18. The method of claim 17, wherein the creating is automatically initiated by the electronic device in response to the provisioning.

19. The method of claim 17, wherein the automatically creating comprises:
in response to the provisioning and prior to generation of any request to provision another credential of the credential service provider in the secure element, automatically sending by the credential service provider a credential service provider request to the electronic device; and
in response to the electronic device receiving the sent credential service provider request, automatically initiating creation of the second supplemental security domain with the electronic device.

20. The method of claim 17, wherein the automatically creating comprises:
in response to the provisioning and prior to generation of any request to provision another credential of the credential service provider in the secure element, a commercial entity subsystem automatically sending a commercial entity subsystem request to the electronic device; and
in response to the electronic device receiving the sent commercial entity subsystem request, automatically initiating creation of the second supplemental security domain with the electronic device.

21. The method of claim 17, wherein:
the automatically creating the second supplemental security domain comprises storing credential service provider data in the second supplemental security domain; and
the credential service provider data is associated with the credential service provider.

22. The method of claim 21, wherein the credential service provider data comprises a public key that is associated with the credential service provider.

23. The method of claim 21, wherein the credential service provider data comprises a supplemental security domain key encrypted with a public key that is associated with the credential service provider.

24. The method of claim 17, wherein the credential comprises a commerce credential.

25. A non-transitory computer-readable medium comprising computer-readable instructions recorded thereon for:
prior to an event, storing credential service provider data from a credential service provider in a supplemental security domain of a secure element on an electronic device, wherein the credential service provider data comprises a credential service provider public key of a credential service provider public-private key set, the credential service provider public key used for encryption of a supplemental security domain key corresponding to the supplemental security domain; and after the event, transmitting information encrypted with the credential service provider data from the electronic device for enabling secure provisioning of a first credential of the credential service provider on the supplemental security domain, wherein the event comprises at least one of:

an end user achieving access to the electronic device; or generation of an initial request to provision the first credential on the secure element.

26. The non-transitory computer-readable medium of claim 25, wherein the transmitting comprises transmitting a supplemental security domain key of the supplemental security domain that is encrypted with the credential service provider public key of the stored credential service provider data.

27. The non-transitory computer-readable medium of claim 25, wherein the transmitting comprises transmitting the information from the electronic device to the credential service provider.

28. A device comprising:
a memory; and
at least one processor configured to:
prior to an event, store credential service provider data of a credential service provider in a first supplemental security domain on a secure element of the device, wherein the credential service provider data comprises a credential service provider public key of a credential service provider public-private key set;
after the event, establish a secure communication channel between the secure element and the credential service provider using the stored credential service provider data;
provision a credential of the credential service provider in the first supplemental security domain using the secure communication channel; and
in response to a confirmation that the credential of the credential service provider has been provisioned in the first supplemental security domain, automatically create a second supplemental security domain on the secure element, the second supplemental security domain corresponding to the credential service provider.

29. The device of claim 28, wherein the credential comprises a commerce credential.

30. The device of claim 28, wherein the event comprises generation of the request by an end user to provision the credential of the credential service provider on the device.

31. The device of claim 28, wherein the at least one processor is configured to automatically initiate creation of the second supplemental security domain in response to the confirmation without detection of any act of an end user after the provisioning.

32. The device of claim 28, wherein the at least one processor is further configured to receive the credential service provider data from a secure element vendor subsystem.

33. The device of claim 28, wherein the at least one processor is configured to establish the secure communication channel between the secure element and the credential service provider by transmission of a first supplemental security domain key of the first supplemental security domain, which is encrypted by the credential service provider public key of the stored credential service provider data, from the first supplemental security domain to the credential service provider.

34. The device of claim 28, wherein the at least one processor is configured to automatically create the second supplemental security domain on the secure element by storing credential service provider data in the second supplemental security domain, the credential service provider data being associated with the credential service provider.

35. A non-transitory computer-readable medium comprising computer-readable instructions recorded thereon for:
storing credential service provider data of a credential service provider in a first supplemental security domain on a secure element of an electronic device;
establishing a secure communication channel between the secure element and the credential service provider using the stored credential service provider data;
provisioning a credential of the credential service provider in the first supplemental security domain using the secure communication channel;
in response to a confirmation that provisioning the credential of the credential service provider has been provisioned in the first supplemental security domain and prior to generation of another request to provision another credential of the credential service provider on the secure element, automatically sending a request to the electronic device; and
in response to the electronic device receiving the sent request, creating a second supplemental security domain on the secure element, the second security domain corresponding to the credential service provider.

36. The non-transitory computer-readable medium of claim 35, wherein the credential comprises a commerce credential.

37. A device comprising:
a memory; and
at least one processor configured to:
prior to an event, receive, at a secure element of the device, BLOB creation data from a credential service provider;
store, at the secure element, a BLOB in a supplemental security domain of the secure element using the received BLOB creation data; and
after the event and after the storing, establish a secure communication channel between the supplemental security domain and the credential service provider using the stored BLOB, for use in provisioning a credential of the credential service provider on the supplemental security domain, wherein:
the stored BLOB comprises a supplemental security domain key transformed by a credential service provider public key of a credential service provider public-private key set; and
the received BLOB creation data comprises at least one of:
the credential service provider public key of the credential service provider public-private key set, the credential service provider public key being separate from the supplemental security domain key; or
the supplemental security domain key transformed by the credential service provider public key of the credential service provider public-private key set.

38. The device of claim 37, wherein:
the received BLOB creation data comprises the credential service provider public key of the credential service provider public-private key set; and the at least one processor is configured to perform the storing by:
  generating, at the secure element, the supplemental security domain key; and
  after the generating, transforming the generated supplemental security domain key, at the secure element, by the credential service provider public key of the received BLOB creation data.

* * * * *